(12) United States Patent
Bismarck et al.

(10) Patent No.: US 8,772,205 B2
(45) Date of Patent: Jul. 8, 2014

(54) WATER-SOLUBLE DEGRADABLE SYNTHETIC VINYL POLYMERS AND RELATED METHODS

(75) Inventors: Alexander Bismarck, Peterborough (GB); Emilia M. Kot, London (GB); Rajesh K. Saini, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 195 days.

(21) Appl. No.: 12/771,973

(22) Filed: Apr. 30, 2010

(65) Prior Publication Data
US 2011/0269651 A1 Nov. 3, 2011

(51) Int. Cl.
*C09K 8/60* (2006.01)
*C09K 8/588* (2006.01)
*E21B 43/16* (2006.01)

(52) U.S. Cl.
USPC ........... 507/219; 507/221; 507/902; 507/903; 507/922; 166/305.1

(58) Field of Classification Search
USPC ........ 507/219, 221, 922, 902, 903; 166/305.1
See application file for complete search history.

(56) References Cited

U.S. PATENT DOCUMENTS

| | | | |
|---|---|---|---|
| 2003/0092581 A1* | 5/2003 | Crews | 507/100 |
| 2005/0045328 A1 | 3/2005 | Frost et al. | |
| 2006/0234871 A1* | 10/2006 | Dalrymple et al. | 507/211 |
| 2006/0254774 A1* | 11/2006 | Saini et al. | 166/300 |
| 2007/0277981 A1* | 12/2007 | Robb et al. | 166/300 |
| 2009/0075845 A1* | 3/2009 | Abad et al. | 507/117 |
| 2009/0105097 A1* | 4/2009 | Abad et al. | 507/241 |
| 2011/0269904 A1 | 11/2011 | Bismarck | |

FOREIGN PATENT DOCUMENTS

WO    WO 2008/151150 A2    11/2008

OTHER PUBLICATIONS

Soga et al., "Physicochemical Characterization of Degradable Thermosensitive Polymeric Micelles," Langmuir 2004, 20, 9388-9395, XP-002658700.
Tsarevsky et al., "Combining Atom Transfer Radical Polymerization and Disulfide/Thiol Redox Chemistry: A Route to Well-Defined (Bio)degradable Polymeric Materials," Macromolecules 2005, 38, 3087-3092, XP-002646814.
International Search Report and Written Opinion for PCT/GB2011/000670 dated Sep. 21, 2011.
Williams, P.A., Handbook of Industrial Water Soluble Polymers, 2007.
Gross, Richard A., Biodegradable Polymers for the Environment, Science, vol. 297, pp. 803-807, 2002.
Feng, Y., Hydrophobically Associating Polyacrylamides and Their Partially Hydrolyzed Derivatives Prepared by Post-Modification. 2. Properties of Non-Hydrolyzed Polymers in Pure Water and Brine, Polymer 46, 9283-9295, 2005.

(Continued)

*Primary Examiner* — Aiqun Li
(74) *Attorney, Agent, or Firm* — McDermott Will & Emery LLP; Craig W. Roddy

(57) ABSTRACT

Of the many embodiments presented herein, one is a subterranean treatment fluid comprising: an aqueous fluid; and a water-soluble degradable synthetic vinyl polymer having a labile link in its backbone. Also provided in one instance is a water-soluble degradable synthetic vinyl polymer with labile group in its backbone made by a redox polymerization, the redox polymerization reaction comprising these reactants: a macroinitiator that comprises a labile link, an oxidizing metal ion, and a vinyl monomer.

12 Claims, 21 Drawing Sheets

(56) References Cited

OTHER PUBLICATIONS

Swift, G., Biodegradable Water-Soluble Polymers, Plastics and the Environment, Ch. 12, pp. 491-519, 2003.
Nair, L., Biodegradable Polymers as Biomaterials, Polymer Science 32, pp. 762-798, 2007.
Karlsson, S., Biodegradable Polymers and Environmental Interaction, Polymer Engineering and Science, vol. 38, No. 8, pp. 1251-1253, 1998.
Shimura, Y., Thermodegradable Polyurethanes Having Azo Groups in the Main Chains. 1. Synthesis and Thermal Properties, Macromolecules 26, pp. 5004-5008, 1993.
Yamaoka, T., Linear Type Azo-Containing Polyurethane as Drug-Coating Material for Colon-Specific Delivery: Its Properties, Degradation Behavior, and Utilization for Drug Formulation, Journal of Controlled Release 66, pp. 187-197, 2000.
Tanchak, O., Light-Induced Reversible Volume Changes in Thin Films of Azo Polymers: The Photomechanical Effect, Macromolecules 38, pp. 10566-10570, 2005.
Nuyken, O., Synthesis and Application of Thermosensitive Microcapsules Containing Azo Groups, Die Angewandte Makromolekulare Chemie 187, pp. 207-224, 1991.
Van Den Mooter, G., Use of Azo Polymers for Colon-Specific Drug Delivery, Journal of Pharmaceutical Sciences, vol. 86, No. 12, pp. 1321-1327, 1997.
Lai, J., Linear Azo Polymer Containing Conjugated 5,5'-Azodisalicylic Acid Segments in the Main Chain: Synthesis, Characterization, and Degradation, Macromolecular Rapid Communications 26, pp. 1572-1577, 2005.
Nuyken, O., Graft and Block Copolymers via Polymeric Azo Initiators, Advances in Polymer Science 73, pp. 145-199, 1986.
Kenley, R., Degradable Polymers. Incorporating a Difunctional Azo Compound into a Polymer Network to Produce Thermally Degradable Polyurethanes, Macromolecules 18, pp. 127-131, 1985.
Erciyes, A., Grafting onto Preformed Polyester Network Using Thermolabile Azo Groups, Journal of Applied Polymer Science 41, pp. 1569-1573, 1990.
Popa, A., Some Polyamides, Polyesters, and Polyurethanes Containing Azo Groups, Polymer-Plastics Technology and Engineering 31, pp. 871-884, 1992.
Tunca, U., Polymerization of Acrylamide Initiated by the Redox System Ce(IV)-4,4'-azobis(4-cyano pentanol), Polymer Bulletin 22, pp. 483-488, 1989.
Erciyes, A., Synthesis of Polyacrylamide Flocculants with Poly(Ethylene Glycol) Segments by Redox Polymerization, Die Angewandte Makromolekulare Chemie 200, pp. 163-171, 1992.
Cakmak, I., Preparation of Multiphase Block Copolymers by Redox Polymerization Process, 4a, Die Angewandte Makromolekulare Chemie 224, pp. 49-54, 1995.
Cakmak, I., A Review of Poly(Ethylene Oxide)-Based Block Copolymers, Journal of Macromolecular Science, Part A, Pure Applied Chemistry, pp. 1113-1122, 1995.
Atici, O., Synthesis of Block Copolymers via Redox Polymerization, Journal of Applied Polymer Science, vol. 71, pp. 1385-1395, 1999.
Cakmak, I., Synthesis of Block Copolymers via Redox Polymerization Process: A Critical Review, Iranian Polymer Journal 16, pp. 561-581, 2007.
Nakken, T., Measurements of Polymer Induced Drag Reduction and Polymer Scission in Taylor Flow Using Standard Double-Gap Sample Holders with Axial Symmetry, Journal of Non-Newtonian Fluid Mechanics 97, pp. 1-12, 2001.
Nakken, T., Effects of Molar Mass, Concentration and Thermodynamic Conditions on Polymer-Induced Flow Drag Reduction, European Polymer Journal 40, pp. 181-186, 2004.
Tunca, U., Aqueous Polymerization of Acrylamide Initiated by Redox Pair: CE(IV)-Azo Compounds with Methylol Functional Groups, European Polymer Journal, vol. 31, No. 8, pp. 785-789, 1995.
Hazer, B., Preparation of Multiphase Block Copolymers by Redox Polymerization Process, Die Angewandte Makromolekulare Chemie 195, pp. 121-127, 1992.
Kulicke, W., Zur Frage der Instabilität von Polyacrylamidlösungen, Die Angewandte Makromolekulare Chemie 69, pp. 189-210, 1977.
Jenkins, A., Progress in Polymer Science, an International Review Journal, vol. 8, pp. 373-468, 1982.
Amro, M., Investigation of Polymer Adsorption on Rock Surface of High Saline Reservoirs, Chemical Engineering Technology 25, pp. 1005-1013, 2002.
Hollander, A., Adsorption Characteristics of Polyacrylamide and Sulfonate-Containing Polyacrylamide Copolymers on Sodium Kaolinite, Journal of Applied Polymer Science, vol. 26, pp. 2123-2138, 1981.
Letsch, J., New Results of the Free Radical Ring-Opening Polymerization, Journal of Polymer Science, Part A, Polymer Chemistry, vol. 32, pp. 2867-2871, 1994.
Sanda, F., Radical Ring-Opening Polymerization, Journal of Polymer Science, Part A., Polymer Chemistry, vol. 39, pp. 265-276, 2001.
Wei, Y., Controlled Free Radical Ring-Opening Polymerization and Chain Extension of the "Living" Polymer, Journal of Polymer Science, Part A, Polymer Chemistry, vol. 36, pp. 761-771, 1998.
Bailey, W., Free Radical Ring-Opening Polymerization of 4,7-Dimethyl-2-methylene-1,3-dioxepane and 5,6-Benzo-2-methylene-1,3 Dioxepane1, Macromolecules 15, pp. 711-714, 1982.
Bae, Y., Biodegradable Amphiphilic Multiblock Copolymers and Their Implications for Biomedical Applications, Journal of Controlled Release 64, pp. 3-13, 2000.
Misra, G., Aqueous Redox Polymerization of Acrylamide Initiated by Citric Acid/Permanganate, Die Angewandte Makromolekulare Chemie 177, pp. 21-37, 1976.
Arslan, H., Ceric Ion Initiation of Methyl Methacrylate from Poly(Glycidyl Azide)-Diol, European Polymer Journal 37, pp. 581-585, 2001.
Cakmak, I., Synthesis of Block Copolymers by Redox Macro Initiators, Journal of Macromolecular Science, Part A, Pure Applied Chemistry, A32, pp. 197-206, 1995.
Sarac, A.S., "Redox Polymerization," Prog. Polym. Sci. 1999, 24, 1149-1204.

\* cited by examiner

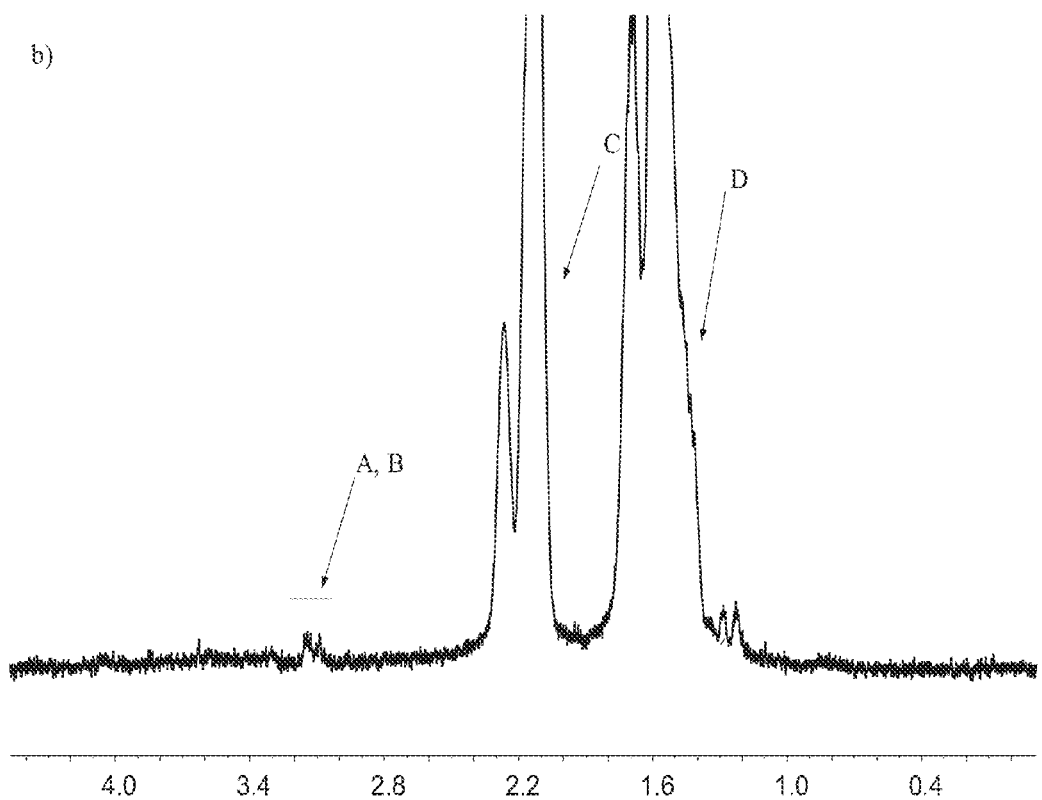

L-cystine

A   B

PAM initiated from L-cystine

A   B   D   C

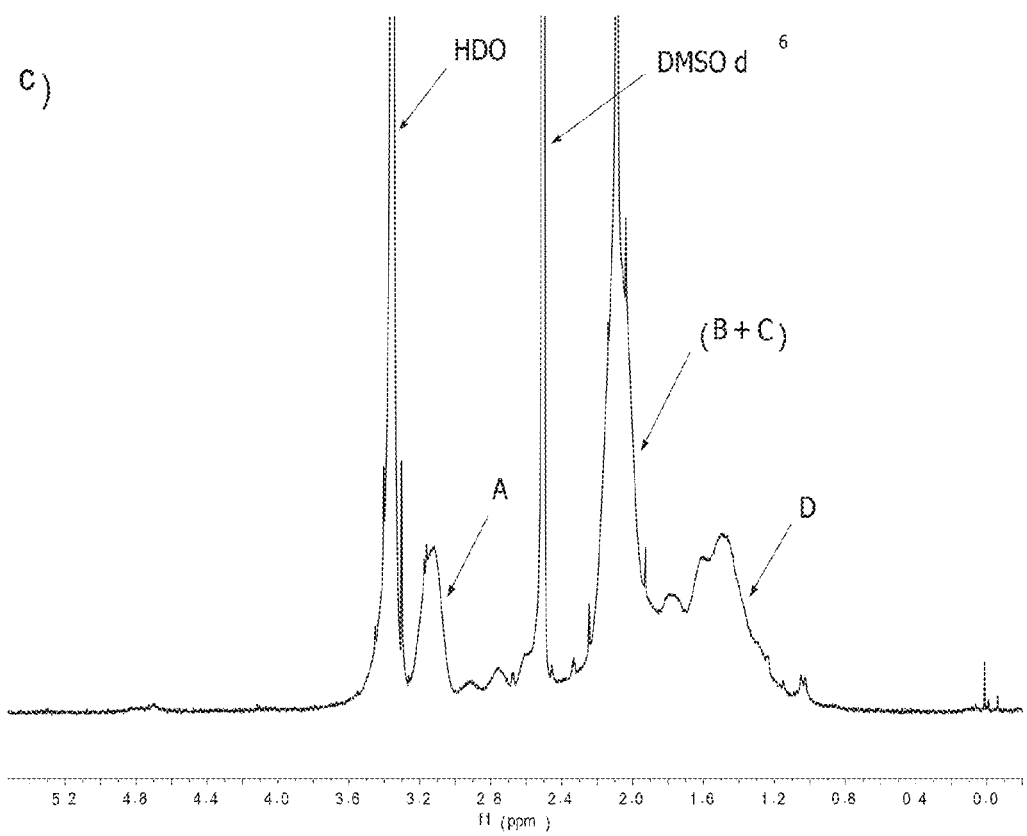

WATER-SOLUBLE DEGRADABLE SYNTHETIC VINYL POLYMERS AND RELATED METHODS

BACKGROUND

The present invention relates to water-soluble degradable synthetic vinyl polymers and methods of use thereof in subterranean applications. More specifically, at least in some embodiments, the present invention relates to water-soluble degradable synthetic vinyl polymers having at least one labile group in the backbone of the polymer, and methods of use thereof in subterranean applications.

Water-soluble polymers are used in a wide range of industries and products. For example, they may be used as rheology modifiers, stabilizers, and emulsifiers in a variety of products. They are also used in detergents, shampoos, food products, skin lotions, textiles, paints and in the pharmaceutical and oil industry as viscosifiers, flocculants, drag reducing agents, or mobility control fluids. Additionally, water-soluble polymers play an important role in the production of oil and gas. They are used in treatment fluids in various applications such as fracturing, drilling, completion, and work-over applications. Oftentimes, such water-soluble polymers are used as viscosifiers in such application.

One problem associated with the use of synthetic polymers is that they generally are stable in the environment, and thus, may be retained in water or in the ground for many years. This is a particularly troublesome aspect of using such polymers in subterranean applications, especially because of the high molecular weight of the polymers that are typically used. For example, in subterranean applications, adsorption and accumulation of such polymers on mineral surfaces within the formation can lead to the entrapment and formation of undesirable deposits within the formation, which can negatively impact the permeability and conductivity of the formation. Moreover, oftentimes a follow-up expensive clean-up operation is often required to combat this.

In subterranean applications, there is a need for polymers of high molecular weight that can be degraded to smaller molecular weights for a number of applications, including hydraulic fracturing, gravel packing, "frac-packing," fluid loss pills, diverting particles, viscous sweeps, work-over fluids, drilling fluids, rheological modifiers, and so forth. Generally, these subterranean treatment fluids comprise viscosifying agents that comprise natural polysaccharides such as guar, cellulose, xanthan, and the like or water-soluble polymers synthetic polymers that have hydrocarbon backbones, which are generally thought to not be degradable due to their resistance to hydrolysis, oxidative cleavage, temperature or enzymatic attack.

In these subterranean applications, it is preferable for the polymer to be removed from the formation after its use has been exploited. For example, in hydraulic fracturing applications, aqueous crosslinked gels that are generally prepared from viscosifying agents are used to fracture formations and transport proppant into those fractures. After placement of the proppant in the fracture(s), it is preferable for the polymer that made up the crosslinked gel to be broken in some way for recovery of a lower viscosity fluid. Using oxidative breakers or enzymes is a common method that is used to break such polymers to reduce the viscosity of the fluid for recovery.

There are several drawbacks to such methods. Oxidative breakers may be dissolved in the fluid, but may be lost due to fluid loss as the gel loses water into the porous oil-containing rock of the formation. To circumvent this type of problem, an excess of the oxidative breakers may be used or a fluid loss control agent may be used, which may not be desirable. In some instances, the addition of an oxidative breaker may prematurely decrease the viscosity of the fluid, and thus more polymer may be needed to transport the proppants (which is undesirable). Enzymes are specific to the substrates in which they are effective and there is a diffusion limitation on the movement of enzymes through a crosslinked gel system. Enzymes also have a narrow temperature and pH range where they are effective. Enzymes lose their activity as temperature is raised and most of the enzymes are ineffective above 60° C. Enzymes are also ineffective at extreme pH values and oftentimes work best under neutral conditions. Most of the fluids used in oil-field applications have a pH of 8 and above where the effectiveness of enzymes is low. Furthermore, oxidative breakers may be dissolved in the fluid, but may be lost due to fluid loss as the gel loses water into the porous oil-containing rock of the formation.

To circumvent this type of problem, an excess of oxidants may be used or a fluid loss control agent may be used. The use of enzymes and oxidants and enzymes may not guarantee the complete degradation of the polymer system, irrespective of the use of additional fluid loss control agents. The incomplete degradation of the polymer system used can lead to deposition of polymeric materials onto the oil-bearing rock surfaces within the formation, eventually impeding production. Additionally, an incomplete degradation can lead to an ineffective reduction in the viscosity of the fracturing fluid to the level needed to deposit the proppant and return the fluid back to the surface.

SUMMARY

The present invention relates to water-soluble degradable synthetic vinyl polymers and methods of use thereof in subterranean applications. More specifically, at least in some embodiments, the present invention relates to water-soluble degradable synthetic vinyl polymers having at least one labile group in the backbone of the polymer, and methods of use thereof in subterranean applications.

In one embodiment, the present invention provides a water-soluble degradable synthetic vinyl polymer with labile group in its backbone made by a redox polymerization, the redox polymerization reaction comprising these reactants: a macroinitiator that comprises a labile link, an oxidizing metal ion, and a vinyl monomer.

In one embodiment, the present invention provides a micelle having an outer layer comprising a water-soluble degradable synthetic vinyl polymer with labile group in its backbone and an enclosed chemical.

In one embodiment, the present invention provides an emulsion comprising an external phase, an internal phase, and an emulsion stabilizer that comprises a water-soluble degradable synthetic vinyl polymer with a labile group in its backbone.

In one embodiment, the present invention provides a process for polymerizing one or more vinyl monomers to form a water-soluble degradable synthetic vinyl polymer, the process comprising: contacting the vinyl monomer with a macroinitiator comprising a labile group and an oxidizing metal ion under redox polymerization conditions to produce a water-soluble degradable synthetic vinyl polymer with a labile group in its backbone.

In one embodiment, the present invention provides a subterranean treatment fluid comprising: an aqueous fluid; and a water-soluble degradable synthetic vinyl polymer having a labile link in its backbone.

In one embodiment, the present invention provides a method comprising: providing a treatment fluid comprising a water-soluble degradable synthetic vinyl polymer having a labile link in its backbone; and placing the treatment fluid in a subterranean formation.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

FIG. 2B is an $H^1$-NMR spectra of PAM initiated from L-cystine recorded in D2O.

FIGS. 7A and 7B are $H^1$-NMR spectra of poly(acrylonitrile) and poly(acrylamide)-block-poly(acrylonitrile) synthesized using poly(acrylamide) with thermo-sensitive azo groups in the backbone.

DESCRIPTION OF THE PREFERRED EMBODIMENTS

Figure 1:
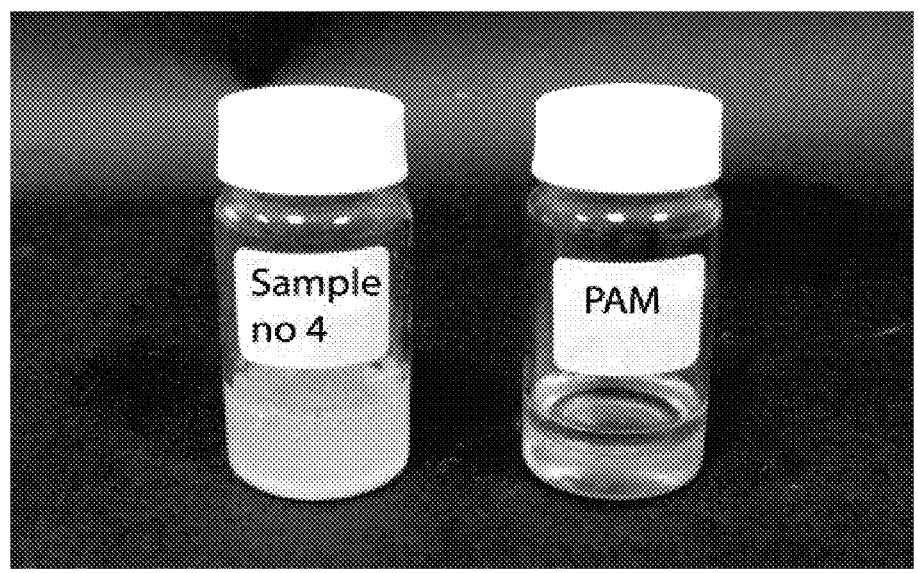
FIG. 1 illustrates a stable emulsion formed with a water-soluble degradable synthetic vinyl polymer of the present invention.

The present invention relates to water-soluble degradable synthetic vinyl polymers and methods of use thereof in subterranean applications. More specifically, at least in some embodiments, the present invention relates to water-soluble degradable synthetic vinyl polymers having at least one labile group in the backbone of the polymer, and methods of use thereof in subterranean applications.

Of the many advantages of water-soluble degradable synthetic vinyl polymers and methods of the present invention, only some of which are discussed or eluded to herein, one advantage is that these water-soluble degradable synthetic vinyl polymers can be tailored to degrade at a desired point in time and/or under desired conditions (e.g., downhole conditions), taking into account the conditions encountered in a given subterranean application. In some embodiments, the degradability of the water-soluble degradable synthetic vinyl polymers may be tailored for wells of different temperature conditions from room temperature to very high temperature. This allows for relatively complete degradability of the polymer when used downhole, resulting in less potential for formation damage. The water-soluble degradable synthetic vinyl polymers of the present invention degrade into smaller pieces that are much more soluble in water and may be produced back easily, and therefore, are believed to not accumulate or plug the formation. Further, these water-soluble degradable synthetic vinyl polymers may be crosslinked if desired to provide increased viscosity for some subterranean treatment fluids, e.g., fracturing fluids, "frac-pack" fluids, gravel packing fluids, fluid loss control pills, friction reducers, viscous sweeps, fluid loss particles, rheological modifiers, and the like. Additionally, it is believed that these polymers do not present the same sort of impurity deposition issues that natural polymers can. A further advantage is that filter cakes formed by these polymers can self destruct. Other advantages of the present invention will be apparent to one skilled in the art with the benefit of this disclosure.

As used herein, the term "treatment," or "treating," refers to any subterranean operation that uses a fluid in conjunction with a desired function and/or for a desired purpose. The term "treatment," or "treating," does not imply any particular action by the fluid or any particular component thereof.

The terms "degradation" and/or "degradable" refer to the conversion of materials into smaller components, intermediates, or end products.

The water-soluble degradable synthetic vinyl polymers of the present invention comprise at least one labile link in their polymer backbone that can be tailored to make the polymers degrade at a desired time and/or at desired conditions. The term "water-soluble degradable synthetic vinyl polymer" as used herein refers to a synthetic vinyl polymer that has at least one labile link in its backbone structure that imparts degradability to the synthetic vinyl polymer.

The backbone structures of the water-soluble degradable synthetic vinyl polymers of the present invention are formed from vinyl monomers. The term "vinyl monomer" as used herein refers to a monomer that has a double bond that is capable of free radical polymerization. Suitable examples include, but are not limited to, acrylamide and vinyl monomers. Suitable monomers may include, but are not limited to, acrylamide, vinyl acetate, 2-acrylamido-2-methylpropane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, vinylbenzene sulfonic acid, methacrylic acid, vinyl caprolactam, N-vinylformamide, diallyl amine, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid, alkyl acrylates, alkyl methacrylates, alkyl acrylamides, alkyl methacrylamides alkyl dimethylammoniumethyl methacrylate halides, alkyl dimethylammoniumpropyl methacrylamide halides, any derivative thereof, or any combination thereof.

The incorporation of labile groups into the polymer backbone of the polymer allows tailoring of the degradation condition and kinetics. Multiple labile links may be present due to termination of the polymerization by disproportionation. A variety of labile groups can be included in the backbone for various conditions. For example, an amide group in the backbone will give high temperature stability. An ester group in the backbone will give slightly less stability at higher temperatures than an amide group. Groups can also be added in the backbone to degrade at very low temperatures for application in low temperature wells. Incorporation of orthoester group, for example, in the backbone will give stability at high pH (>8) and degrade quickly at low pH (<8). Similarly acetal, carbonate, and other labile groups can be included to get the desired degradable properties. Polymers with these sorts of groups should degrade to small polymers that should not accumulate, for example, in aquatic species such as shrimp or fish.

These labile links may comprise any suitable labile group that is sufficiently water soluble. These include, but are not limited to, ester groups, amide groups, carbonate groups, azo groups, disulfide groups, orthoester groups, acetal groups, etherester groups, ether groups, silyl groups, phosphazine groups, urethane groups, esteramide groups, etheramide groups, anhydride groups, and any derivative or combination thereof. In some embodiments, the labile links may be derived from oligomeric or short chain molecules that include, but are not limited to, poly(anhydrides); poly(orthoesters); orthoesters; poly(lactic acids); poly(glycolic acids); poly(caprolactones); poly(hydroxybutyrates); polyphosphazenes; poly(carbonates); polyacetals; polyetheresters; polyesteramides; polycyanoacrylates; polyurethanes; polyacrylates; any derivative, copolymer, or combination thereof. In some embodiments, the labile links may be derived from a hydrophilic polymeric block comprising at least one compound selected from the group consisting of: a poly(alkylene glycol); a poly(alcohol) made by the hydrolysis of poly(vinyl acetate); poly(vinyl pyrrolidone); a polysaccharide; a chitin; a chitosan; a protein; a poly(amino acid); a poly(alkylene oxide); a poly(amide); a poly(acid); a polyol; and any derivative, copolymer, or combination thereof.

In some embodiments, azo-based labile groups may be preferred because of their thermal, chemical, photochemical, and biological properties. Aromatic azo-groups confer biodegradability. Aliphatic azo-groups are thermally cleavable creating free radicals.

To produce water-soluble degradable synthetic vinyl polymers of the present invention having a suitable molecular weight, redox polymerization is the preferred mechanism. These labile links are incorporated within the backbone structure of the polymer through suitable redox polymerization reactions. Macroinitiators (i.e., reducing agents that comprise the labile links) may be used to initiate the polymerization at both ends of the monomer to insert the labile links into the backbone structure. The polymerization proceeds through a redox initiated free radical polymerization of the vinyl monomers with the incorporation of at least one macroinitiator into the polymer backbone. In many instances, multiple macroinitiators may be incorporated into a polymer molecule, resulting in the presence of at least one labile link in the polymer backbone. The redox polymerization method can be tuned to achieve the desired molecular weight by controlling the time, concentration of the monomers, and methodology, for example, by using micellar polymerization. Examples of achievable molecular weights range from about 500,000 to about 15,000,000 or higher for some polymers.

It is believed that there are at least two advantages associated with using a redox polymerization method in this invention. First, the polymerization can be carried out at low temperatures, and second, the polymerization gives high molecular weight polymers at a high yield, resulting in polymers having suitable molecular weights for subterranean applications. It is believed that these advantages are due to the very short induction period of the oxidation pair and low activation energy associated with the reaction (e.g., 40-80 kJmol$^{-1}$). Another potential advantage is that a wide array of oxidizing ions and reducing agents can be used, which provides a range of options to incorporate any desired degradable reducing agent. This way, high molecular weight polymers can be produced with tailored degradability.

In an example of a suitable redox polymerization reaction, an oxidizing metal ion is used to activate the macroinitiator to create the radical, (such as water-soluble cerium (IV), manganese (III), copper (II), vanadium (V), cobalt (III), chromium(VI), and iron (III) and reducing agents (such as alcohols, diols, aldeydes, amines, acids, and amides) generate free radicals, which initiate polymerization. If using chromium, one should be mindful of using a high concentration, and the potential for toxicity concerns to arise. The reducing agent also comprises the labile group, and at least two reducing groups. Preferably, the reducing groups comprise hydroxides, aldehydes, amines, or acids, in the molecule at two ends of the macroinitiator to incorporate the labile group in the backbone. The labile groups that we described before should have these types of groups at the end to make them behave as macro initiators.

An example of a redox polymerization with diols as bifunctional reducing agents and Ce (IV) as an oxidizing metal ion (e.g., ceric ammonium nitrate) is presented below by Reaction 1, wherein R is a microinitiator that contains a labile group containing two diol groups, =M is a vinyl monomer, and P(M) are various vinyl polymers. R is the labile group or polymers that we described before, but have two reducing groups at the end of that polymer or molecule. The molecular weight of the final polymer is about 2,000,000 to about 4,000,000.

Reaction 1

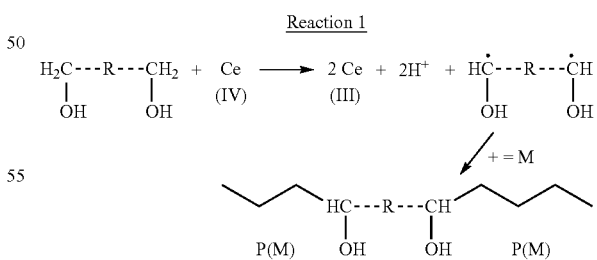

Nonlimiting examples of suitable macroinitiators comprising labile groups include poly(caprolactone)diol (Formula 1 below), which has ester groups that hydrolyze to provide degradability; 2,2'-azobis[2-methyl-N-(2-hydroxyethyl) priopionamide] (Formula 2 below), which has an amide group that provides degradability; and L-cystine (Formula 3), which has a disulfide link, which provides degradability.

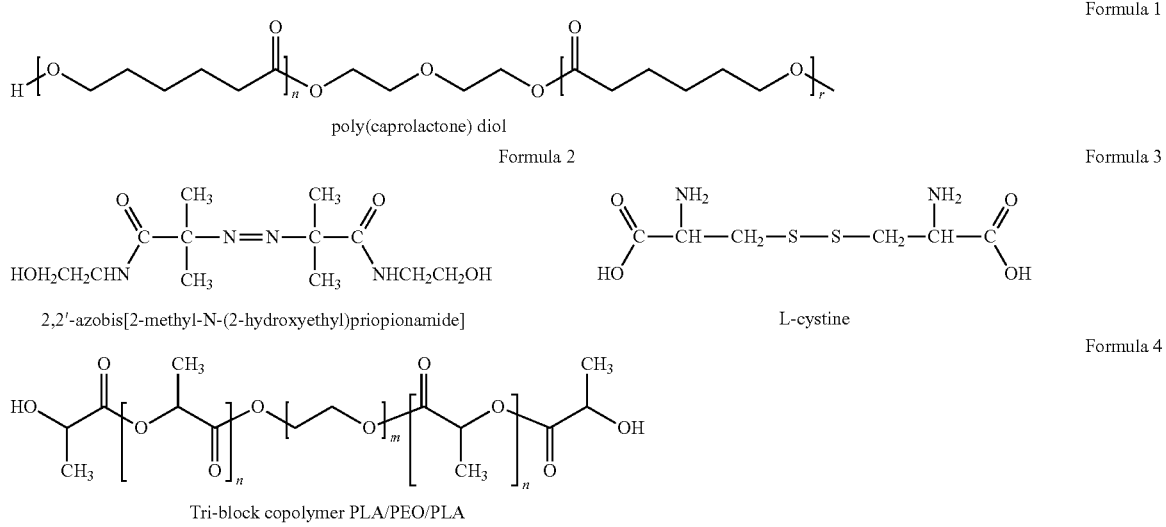

Formula 1: poly(caprolactone) diol

Formula 2: 2,2'-azobis[2-methyl-N-(2-hydroxyethyl)priopionamide]

Formula 3: L-cystine

Formula 4: Tri-block copolymer PLA/PEO/PLA

Depending on the character of the labile group, the resultant water-soluble degradable synthetic vinyl polymer can degrade by an action chosen from the group consisting of: oxidation, reducing agent, photo-degradation, thermal degradation, hydrolysis, and microbial degradation. The rates at which the water-soluble degradable synthetic vinyl polymers of the present invention degrade are dependent on at least the type of labile group, composition, sequence, length, molecular geometry, molecular weight, stereochemistry, hydrophilicity, hydrophobicity, and additives. Also, the environment to which the degradable water-soluble degradable synthetic vinyl polymer is subjected may affect how it degrades, e.g., temperature, presence of moisture, oxygen, microorganisms, enzymes, pH, and the like.

These water-soluble degradable synthetic vinyl polymers of the present may be crosslinked. Examples of suitable crosslinking agents include metal crosslinking agent (e.g., Zr ion, Ti ion, Al ion, Cr ion and B ion). The preferred crosslinking agent may be determined by the type of functional groups present in the polymer. A carboxylate labile link would dictate that Zr ion and/or Al ion may be preferred. Hydroxyl groups dictate the preferred use of Zr ions and/or B ions. For some applications covalent crosslinking can also be achieved. This may be accomplished by using reactive bifunctional compounds to crosslink the polymer. Suitable reactive bifunctional compounds include, but are not limited to, epichlorohydrin and glyoxal.

In some embodiments, the water-soluble degradable synthetic vinyl polymers of the present invention may be used to form micelles for the encapsulation of certain chemicals, such as oxidizers, chelators, activators, acid-precursors, and the like, for a delayed release delivery. Any chemical included within the micelle is referred to as "enclosed chemical." In such embodiments, a micelle may comprise an outer surface that comprises a water-soluble degradable synthetic vinyl polymer of the present invention and an enclosed chemical. Such micelles may be useful in the delayed delivery of the enclosed chemical to a desired application.

The aqueous treatment fluids of the present invention generally comprise an aqueous fluid, and a water-soluble degradable synthetic vinyl polymer of the present invention that comprises a labile link in the backbone. These fluids may be used in any applicable subterranean treatment application. Such subterranean treatments include, but are not limited to, stimulation treatments (e.g., fracturing treatments, acidizing treatments, etc.) and completion operations. They may also be used as gelling agents in some fluids, for example, in gelled fluid pills that are used downhole (e.g., fluid loss pills). Fluids incorporating the water-soluble degradable synthetic vinyl polymers of the present invention should degrade under downhole conditions. Those of ordinary skill in the art, with the benefit of this disclosure, will be able to recognize a suitable subterranean treatment where friction reduction may be desired.

Suitable aqueous fluids that may be used in the present invention include, but are not limited to, fresh water, salt water, brine, seawater, or any combination thereof. Generally, the aqueous fluid used may be from any source, provided it does not contain an excess of compounds that may adversely affect the other components used in accordance with this invention or the subterranean formation.

If used as a friction reducer, the water-soluble degradable synthetic vinyl polymers of the present invention should reduce energy losses due to friction in the aqueous treatment fluids of the present invention. For example, the water-soluble degradable synthetic vinyl polymer of the present invention may reduce energy losses during introduction of the aqueous treatment fluid into a well bore due to friction between the aqueous treatment fluid in turbulent flow and the formation and/or tubular good(s) (e.g., a pipe, coiled tubing, etc.) disposed in the well bore.

For any particular subterranean treatment application, the water-soluble degradable synthetic vinyl polymers of the present invention should have a molecular weight sufficient to provide a desired level of viscosity, friction reduction, and the like. For example, in some embodiments, the weight average molecular weight of the friction reducing copolymers may be in the range of from about 2,5000,000 to about 20,000.000, as determined using intrinsic viscosity measurements.

The water-soluble degradable synthetic vinyl polymers of the present invention should be included in the aqueous treatment fluids of the present invention in an amount sufficient to provide the desired viscosity, reduction of friction, etc. In some embodiments, a water-soluble degradable synthetic vinyl polymer of the present invention may be present in an amount in the range of from about 0.01% to about 10% by weight of the aqueous treatment fluid. In some embodiments, a water-soluble degradable synthetic vinyl polymer of the present invention may be present in an amount in the range of from about 0.025% to about 4% by weight of the aqueous treatment fluid. For a friction reduction application, generally a longer polymer that can absorb the turbulence in the water thereby reducing friction is advisable. Low molecular weight polymers are not as effective in most instances. However, when the water-soluble degradable synthetic vinyl polymers of the present invention are used in hydraulic fracturing applications, fluid loss control pills, or other applications smaller molecular weight polymers may be sued as they can be crosslinked.

When used as friction reducers, generally the water-soluble degradable synthetic vinyl polymers of the present invention are not crosslinked.

When used as friction reducers, an amount of the water-soluble degradable synthetic vinyl polymers of the present invention to include may be about 0.1 gal/Mgal to about 5 gal/Mgal concentration (about 0.01% to about 0.5%), for example, in slick water fracs.

Additional additives may be included in the aqueous treatment fluids of the present invention as deemed appropriate by one of ordinary skill in the art, with the benefit of this disclosure. Examples of such additives include, but are not limited to, corrosion inhibitors, proppant particulates, acids, fluid loss control additives, surfactants, breakers, iron-control inhibitors, scale inhibitors, and clay stabilizers. For example, an acid may be included in the aqueous treatment fluids, among other things, for a matrix or fracture acidizing treatment. In fracturing embodiments, proppant particulates may be included in the aqueous treatment fluids to prevent the fracture from closing when the hydraulic pressure is released.

In some embodiments, the water-soluble degradable synthetic vinyl polymers may be used in a fracturing treatment. In such treatments, a fracturing fluid comprising a water-soluble degradable synthetic vinyl polymer of the present invention is placed in a subterranean formation at a pressure sufficient to create or enhance a fracture in the subterranean formation. In some embodiments, the water-soluble degradable synthetic vinyl polymer may be used in an amount of 0.1 about to about 10% by weight. In certain fracturing applications, the polymer may be crosslinked with any suitable metal ion or other crosslinking material.

In some embodiments, the water-soluble degradable synthetic vinyl polymers may be used in a subterranean treatment fluid as a friction reducer.

In some embodiments, the water-soluble degradable synthetic vinyl polymers may be used in a subterranean treatment fluid as a viscosifier, for example, in a fluid loss pill or a completion fluid. In a fluid loss pill the polymer may be crosslinked to achieve a stiff gel thereby not allowing it to penetrate the formation and damage the well bore permeability.

In some embodiments, the present invention provides a water-soluble degradable synthetic vinyl polymer made by a redox polymerization comprising a reducing agent with a labile group, an oxidizing agent, and a monomer.

In some embodiments, the present invention provides a process for polymerizing one or more vinyl monomers to form a water-soluble degradable synthetic vinyl polymer, the process comprising: contacting the vinyl monomer or monomers with an oxidizing agent and a macroinitiator comprising a labile link.

In some embodiments, the present invention provides a subterranean treatment fluid comprising: an aqueous fluid; and a water-soluble degradable synthetic vinyl polymer.

In some embodiments, the present invention provides a method comprising: providing a treatment fluid comprising a water-soluble degradable synthetic vinyl polymer; and placing the treatment fluid in a subterranean formation.

In some embodiments, the present invention provides a method comprising: providing a fracturing fluid comprising a water-soluble degradable synthetic vinyl polymer; and placing the fracturing fluid in a subterranean formation at a pressure sufficient to create or enhance a fracture therein.

In other embodiments, the water-soluble degradable synthetic vinyl polymers of the present invention may be used in a completion fluid, a gravel packing fluid or a drilling fluids (e.g., as a rheology modifier).

In other embodiments, the water-soluble degradable synthetic vinyl polymers of the present invention may be used in a concentrated form as a diverter.

In some embodiments, the water-soluble degradable synthetic vinyl polymers of the present invention may be useful in water purification applications.

In some embodiments, the water-soluble degradable synthetic vinyl polymer may be used in a cementing application to temporarily suspend the cement particles while the cement sets. The water-soluble degradable synthetic vinyl polymers may be used in such cementing operations to control settling and modify the rheology.

In some embodiments, the water-soluble degradable synthetic vinyl polymers may be used as a rheology modifier in a drilling fluid.

In some embodiments, the water-soluble degradable synthetic vinyl polymers may be used to make self-degrading fluid loss particles by crosslinking.

In some embodiments, the water-soluble degradable synthetic vinyl polymers may be used to make self-degrading diverting particles.

In some embodiments, the water-soluble degradable synthetic vinyl polymers may be used in water purification. For instance, in some embodiments, the water-soluble degradable synthetic vinyl polymers may be used as chelators for undesired metal ions in fluids that may adversely affect their performance for their desired use.

In some embodiments, the water-soluble degradable synthetic vinyl polymers may be used in flocculation applications for water treatments and other applications.

In some embodiments, the water-soluble degradable synthetic vinyl polymers may be used to encapsulate a reactive chemical in the polymer shell.

In some embodiments, the water-soluble degradable synthetic vinyl polymers of the present invention may be used as emulsion stabilizers. For instance, Sample 4 in FIG. 1 illustrates a stable emulsion Ruined with a water water-soluble degradable synthetic vinyl polymer of the present invention as compared to another emulsion stabilized by PAM. In such embodiments, an emulsion may comprise an external phase, an internal phase, and an emulsion stabilizer that comprises a water-soluble degradable synthetic vinyl polymer with labile group in the backbone. In some embodiments, the external phase is oil-based and the internal phase is aqueous-based. In some embodiments, the internal phase is oil-based and the external phase is aqueous-based. In some embodiments, a water-soluble degradable synthetic vinyl polymer of the present invention may be present in an amount in the range of from about 0.025% to about 4% by weight of the external phase.

To facilitate a better understanding of the present invention, the following examples of certain aspects of some embodiments are given. In no way should the following examples be read to limit, or define, the scope of the invention.

EXAMPLES

Example 1

Experimental

Materials.

Acrylamide (98%, BDH (BDH is a chemical brand known worldwide for dependability and consistency and is distributed exclusively through VWR, for example at www.vwr.com)) was purified by re-crystallisation from acetone (99.5%, Fluka (Fluka chemicals are available through Sigma Aldrich at www.sigmaaldrich.com)). Vinyl acetate (≥99%, from Fluka), L-cystine (99%, Acros (available from Acros Organics at www.acros.com)), ceric ammonium nitrate (98.5%, Fluka), 70% nitric acid (Aldrich (available through Sigma Aldrich at www.sigmaaldrich.com)), DL-dithiothreitol (≥99.0%, Fluka) were used without further purification.

Polymerization was carried out in deionized water in the oxygen free nitrogen (BOC) atmosphere. Deionized water, from water purifier Option 4 (Elga, UK), was used for all experiments. For NMR analysis $D_2O$ (99.9%, Aldrich) was used.

Procedures: Synthesis of PAM Initiated from L-Cystine.

Monomers: 2.5 (35 mmol) g of acrylamide with 0.14 g (1.6 mmol) of vinyl acetate, 0.1 (0.4 mmol) g of reducing agent—L-cystine and 12 ml of deionized water were placed in a 10 ml one-neck round bottom flask. The flask was sealed with a suba-seal equipped with nitrogen inlet and outlet. The polymerization mixture was purged with nitrogen for 20 min before and 5 min after injecting a ceric solution. The ceric solution was prepared by dissolving 0.22 g (0.4 mmol) of cerium ammonium sulphate in 1.3 ml 1N $HNO_3$. Polymerization was carried out in the dark under nitrogen at 30° C. for 3 h. The product was recovered by precipitation in acetone, which was followed by filtration and multiple washing with acetone in order to remove most of the non-reacted monomers. Synthesized polymer was dialyzed in water in order to remove a non-reacted reducing agent. The yield of the reaction was determined by gravimetric method.

Reduced viscosity measurements of PAM initiated from L-cystine. Degradation of poly(acrylamide) initiated from L-cystine was studied by measuring reduced viscosity with an Ubbelohde viscometer. Polymer solution was prepared by dissolving 0.01 g of PAM initiated from L-cystine in 10 ml of deionized water. The prepared solution was equilibrated at 25° C. and reducing agent 0.15 g of DL threitol was added. After quick mixing, a polymer solution was filtered through a syringe filter (0.22 μm) into an Ubbelohde viscometer. Efflux time of the aqueous polymer solution was measured at 25° C. in 10 min intervals. Relative viscosity $\eta_{re}$ was measured using Equation 1.

$$\eta_{re} = \frac{t_{solution}}{t_{solvent}} \quad \text{Equation 1}$$

where $t_{solution}$ is an efflux time of polymer solution, $t_{solvent}$ in an efflux time of the solvent Results and Discussion—Polymerization of PAM Initiated from L-Cystine. Polymerization of acrylamide initiated from L-cystine is likely to proceed via formation of free radicals on the reducing agent L-cystine as a result of the redox reaction between a reducing agent and an oxidizing ion. The projected mechanism is illustrated in Reaction 2 shown below:

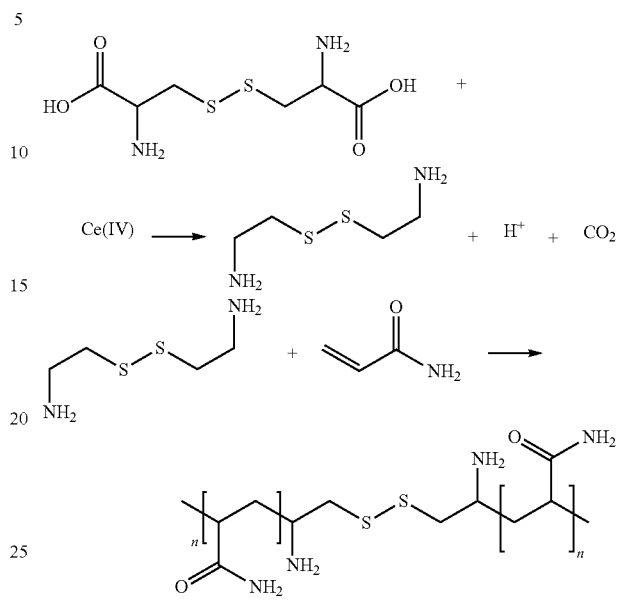

Reaction 2. Mechanism of Acrylamide Polymerization Initiated from L-Cystine

Figure 2A:
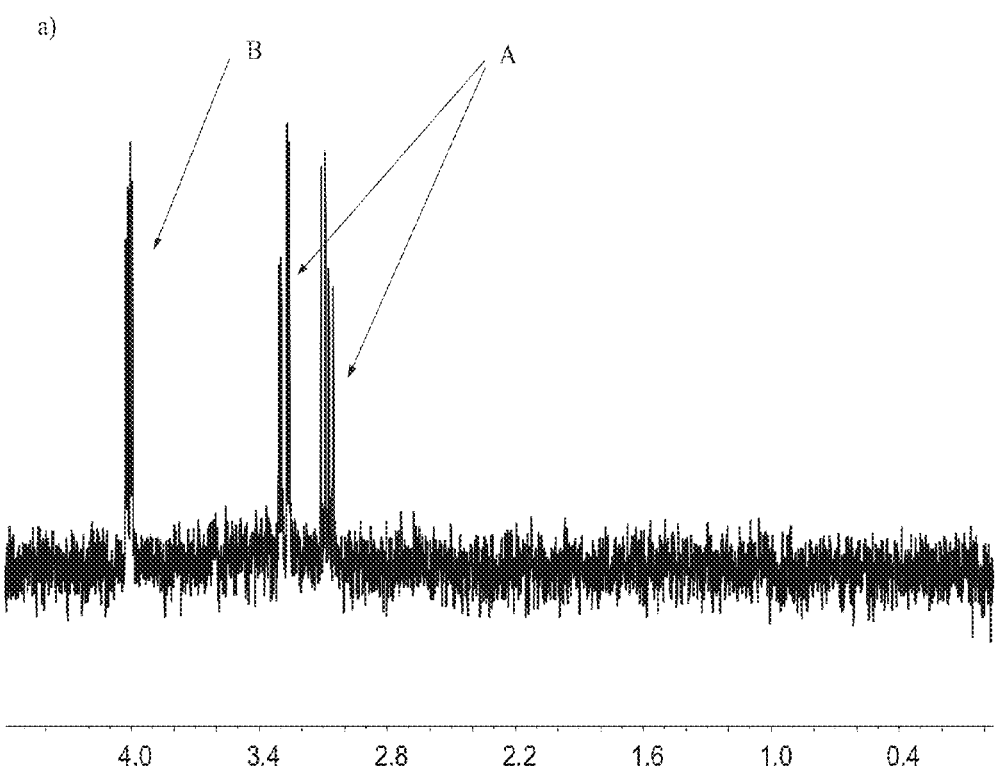
FIG. 2A is an $H^1$-NMR spectrum of L-cystine recorded in $D_2O$.
Figure 2C:
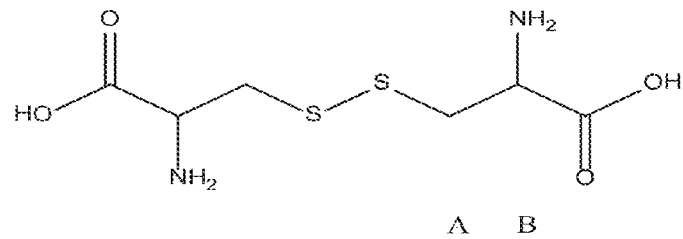
FIG. 2C is a structure of L-cystine and PAM initiated from L-cystine.
Figure 2C:
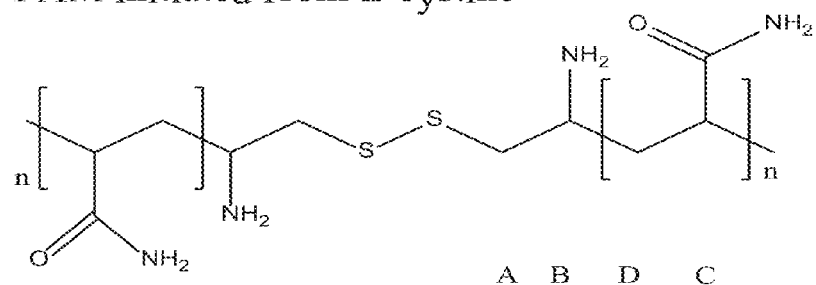

The product obtained as a result of redox polymerization of acrylamide initiated form redox couple Ce(IV)/L-cystine was studied using $H^1$-NMR. Spectra of poly(acrylamide) initiated from L-cystine, and pure L-cystine are presented in FIGS. 2A and 2B. FIG. 2C shows the chemical structures. In the H1-NMR spectrum of L-cystine in D2O solution, three sets of multiplets were identified (FIG. 2A). The methylene protons of $CH_2$ next to disulfide group appear as two systems in the range of 3.05-3.30, presumably as a result of molecular chirality. Protons neighboring carboxylic group can be observed as a multiplet at the region of 3.99-4.04. From polymerization mechanism it can be noticed that chemical environment of the proton B changes once it is within polymer chain, hence only multiplets in the region of 2.98-3.12 can be found. Strong peaks in the range 1.2-1.8 ppm and 2.0-2.4 ppm correspond to the protons of the methylene (E) and methine (D) groups of PAM.

Degradation of Poly(Acrylamide) Initiated from L-Cystine.

Figure 3:
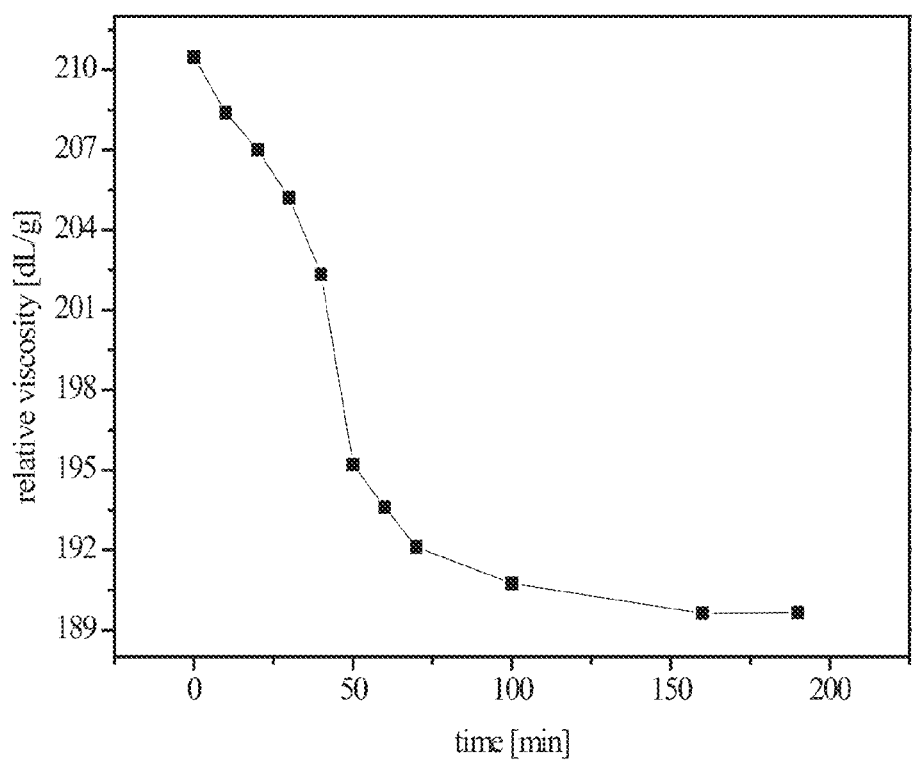
FIG. 3 shows the relative viscosity of the PAM initiated from L-cystine after addition of DL-threitol over time.

An Ubbelhohde viscometer was chosen to monitor the degradation of poly(acrylamide) initiated from L-cystine, in the presence of D,L-threitol. The reduction of the disulfide bonds using D,L-threitol can be completed quickly, thus the choice of simple viscometer seemed to be the best way to observe the changes of the viscosity, which are directly related to the molecular weight. An evident decrease in relative viscosity was observed only during the first hour as shown in FIG. 3, which shows the relative viscosity of the PAM initiated from L-cystine after addition of DL-threitol. Note the change in relative viscosity over time.

Molecular weight of the poly(acrylamide) initiated from L-cystine was examined using GPC analysis before and after adding DL-threitol. Weight average molecular weight $M_w$ of the polymer changed from 170 kDa to 100 kDa suggesting that only one L-cystine was built in the polymer backbone.

Example 2

Experimental

Materials: Acrylamide (98%, BDH) was purified by recrystallization from acetone (99.5%, from Fluka). Polymerization was carried out in deionized water in the oxygen free nitrogen (BOC) atmosphere. Deionized water, from water purifier "Option 4" (available from Elga, UK), was used for all experiments. Other chemicals, such as acrylonitrile (99%, from Sigma-Aldrich), vinyl acetate (≥99%, from Fluka), 2,2' azo-bis[2-methyl-(2-hydroxyethyl)propionamide] (VA-086) (98%, from Wako Chemicals), ceric ammonium nitrate (98.5%, from Fluka), 70% nitric acid (from Sigma-Aldrich), hydroquinone (≥99%, from Sigma-Aldrich), poly(ethylene glycol) (PEO) 2000 (from Sigma-Aldrich, poly(acrylamide) 5-6 million Da (PAM) (from Polysciences, Inc.) sodium nitrate (≥98%, BDH), sodium azide (≥99%, from Fluka), phosphorus pentoxide (≥98%, from Sigma-Aldrich) were used as received.

For NMR analysis the deuterated solvents $d^6$-DMSO (99.9%, from Merck) and $D_2O$ (99.9%, from Sigma-Aldrich) were used.

Preparation and purification of PAM initiated from VA-086 and PEO: 2.5 g (35 mmol) of acrylamide with 0.12 g (1.4 mmol) vinyl acetate and 0.06 g (0.2 mmol) to 0.6 g (2 mmol) of 2,2-azobi[2-methyl-(2-hydroxyl)proponamide] (VA-086) were dissolved in 12 ml of deionized water and charged into a round bottom flask. The solution was purged with nitrogen for 20 min. A ceric solution was prepared by dissolving ceric ammonium nitrate (1/1 to 1/4 molar ratio with respect to hydroxyl end groups of VA-086—Table 1) in 1 ml of 1M nitric acid. The ceric solution was purged with nitrogen for 1 min, before it was injected into the monomer solution containing VA-086. The whole reaction was carried out in the dark under nitrogen at 26° C. for 2 h to 3.5 h. The synthesized product was recovered by precipitation in methanol, which was followed by filtration and multiple washing with methanol in order to remove most of the non-reacted initiator and monomer. Finally, the precipitate was dried to the constant weight over $P_2O_5$ in a desiccator under reduced pressure. The yield of the reaction Y was determined by gravimetric method:

$$Y[\%] = \frac{W_p}{W_m + W_i} \times 100 \quad \text{Equation 2}$$

where $W_p$ is a weight of the precipitated product and $W_m$ and $W_i$ are the weights of the monomers and the initiator used, respectively. Based on $H^1$-NMR spectra VA-086 content in the polymer backbone was calculated by using following equation:

$$VA-086 \text{ content} = \frac{I_{1.06}}{6I_{1.56} + I_{1.06}} \times 100 [mol \%] \quad \text{Equation 3}$$

where $I_{1.06}$ is the integrating area at 1.06 pmm from $CH_3$ protons of VA-086 and $I_{1.56}$ is the integrating area at 1.56 from $CH_2$ of poly(acrylamide).

Before conducting further experiments, the polymer was purified further by dialysis in deionized water. For the dialysis, a dialysis tube with a molecular weight cut off of 3500 Da (Fisher Scientific) was used.

As a control, poly(acrylamide) was deionized using poly(ethylene oxide)/Ce(IV) as redox couple and used for drag reduction test and degradation experiment. Poly(ethylene oxide) was chosen as a non-degradable reducing agent. The same polymerization procedure as outlined above was followed in order to produce non-degradable PAM in the same conditions as PAM containing azo-groups in the backbone. 0.1 g (0.05 mmol) of poly(ethylene oxide) was used with the same amount of monomers as for the polymerization of acrylamide initiated using VA-086. A ceric solution (0.055 g (0.1 mmol) of Ce(IV) in 1 ml of 1N nitric acid) was added to the reaction vessel after purging monomer solution containing reducing agent for 20 min with nitrogen. The whole reaction was carried out in the dark under nitrogen at 35° C. for 2.5 h. The synthesized product was recovered and purified the same way as PAM initiated using VA-086.

Synthesis of Acrylamide-Acrylonitrile Copolymer Using Pam with Azo-Functionalities as a Macroinitiator.

0.04 g of purified azo-group containing PAM was dissolved in 20 ml of water together with 0.08 g (1.5 mmol) of acrylonitrile. The solution was purged with nitrogen for 20 min and placed in an oven at 86° C. for 15 h to initiate polymerization. Acrylonitrile was selected because it is water soluble while poly(acrylonitrile) precipitates from water solution, which allows to observe without using any analytical technique whether the polymerization was successful or not.

Thermolysis of PAM Containing Thermo-Sensitive Azo Groups in the Backbone.

Thermolysis of PAM containing azo groups was carried out at a temperature of 86° C. The choice of the temperature was based on the decomposition temperature of VA-086. A water solution with a polymer concentration of 2 mg/ml was prepared and 200 ppm of hydroquinone was added in order to scavenge any radicals created. Degradation was calculated according to the following equation:

$$\text{Degradation }[\%] = \frac{M_{pt_o} - M_{pt_x}}{M_{pt_o}} \times 100 \quad \text{Equation 4}$$

where $M_{pt_o}$ is a peak molecular weight of the polymer before degradation and $M_{pt_x}$ is a peak molecular weight of the polymer after heating it at 86° C. for some time. $M_p$ was determined using GPC.

Characterization of the Drag Reducing Ability of PAM Containing Azo-Functionalities in the Backbone.

Polymer samples for the drag reduction measurements were prepared by dissolving a predetermined amount of PAM in deionized water. In order to obtain good polymer dissolution, samples were shaken at 200 oscillation/min on a shaker tray overnight. Prior to the measurements, the polymer solutions were filtered using a syringe filter with a pore size of 0.45 μm. Sample volume of 17 ml was used always for all drag reduction measurements. The drag reduction efficiency, the percentage drag reduction (% DR), was calculated following the equations above.

Characterization of PAM containing azo-functionalities in the backbone.

$H^1$-NMR spectra of the deionized polymers and their initiators were recorded on a 2 channel "DRX-400 Spectrometer" (from Bruker, Germany) using $d^6$-DMSO and $D_2O$ as a solvent. Chemical shifts were expressed in parts per million (ppm, δ). Tetramethylsilane (TMS) was used as a generally accepted internal standard.

Thermal behavior of the PAM initiated from VA-086 was examined using a differential scanning calorimeter "DSC Q2000" (from TA Instruments, USA). The differential scanning calorimeter was calibrated using indium and zinc standards to cover whole temperature range. Samples were weighted into aluminum zero pan with a hermetic zero lid and measured in the temperature range of 25° C. to 220° C. in helium atmosphere.

The molecular weight of the deionized polymers were determined by gel permeation chromatography (GPC) "PL-GPC 50" (from Polymer Laboratories, UK) with integrated triple detection system, including refractive index ("PL-RI"), viscometer ("PL-BV 400RT") and light scattering ("PL-LS") detectors using two "TSK-Gel" columns (from TOSOH, Japan). A 0.1N $NaNO_3$ containing 200 ppm $NaN_3$ water solution at 25° C. was used as a mobile phase. A flow rate of 0.7 ml/min was used. Samples were filtered (0.25 μm) before analysis. Poly(ethylene glycol) standards (from Polymer Laboratories, UK) were used for calibration. The data was analyzed using PL Cirrus GPC software (version 3.0) (from Polymer Laboratories, UK).

Drag reduction measurements of commercial poly(acrylamide) from Polysciences, Inc. and poly(acrylamide) containing azo-functionalities in the backbone were carried out using a universal dynamic rheometer "Physica UDS 200" (from Pan Physica, Inc., Germany) equipped with a double-gap Coquette geometry. This was measured in turbulent Taylor flow and not pipe flow. The aspect ratio $\Gamma=(H/\delta^*)$ is 222, where $\delta^*$ is the gap between the rotor and stator $\delta^*=0.5$ mm. For all drag reduction measurements 17 ml samples were used. The temperature was fixed to 25.0±0.5° C. using water circulatory thermostat.

Results and Discussion

Synthesis of PAM Initiated Using a Redox System.

Poly(acrylamide) with azo-functionalities in the backbone was synthesized via redox polymerization where 2,2-azobi [2-methyl-(2-hydroxyl)proponamide] (VA-086)/Ce(IV) used as a redox couple. Polymerization conditions and yield of the polymerization are tabulated in Table 1 below which shows the results and condition of the polymerization of acrylamide by VA-086/Ce(IV) redox system. For most of the experiments the VA-086/Ce(IV) molar ratio was kept constant in order to initiate polymerization from both ends of the reducing agent. However, it can be noticed that for lower concentrations of Ce(IV) higher yields are obtained. For this reason when a higher concentration of VA-086 was used for the polymerization the ratio of VA-086/Ce(IV) was reduced.

PAM initiated from VA-086 (FIG. 4C), confirming the successful incorporation of azo groups into PAM.

Formulae 5 and 6

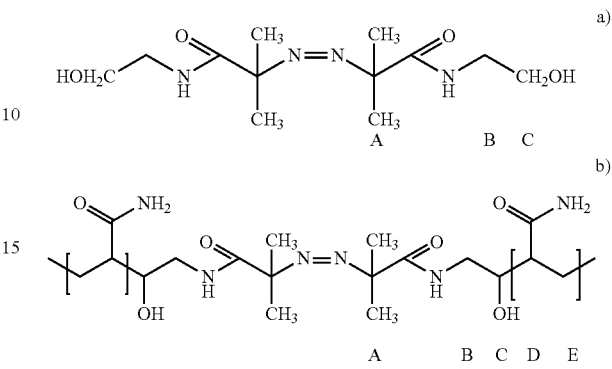

Figure 5:
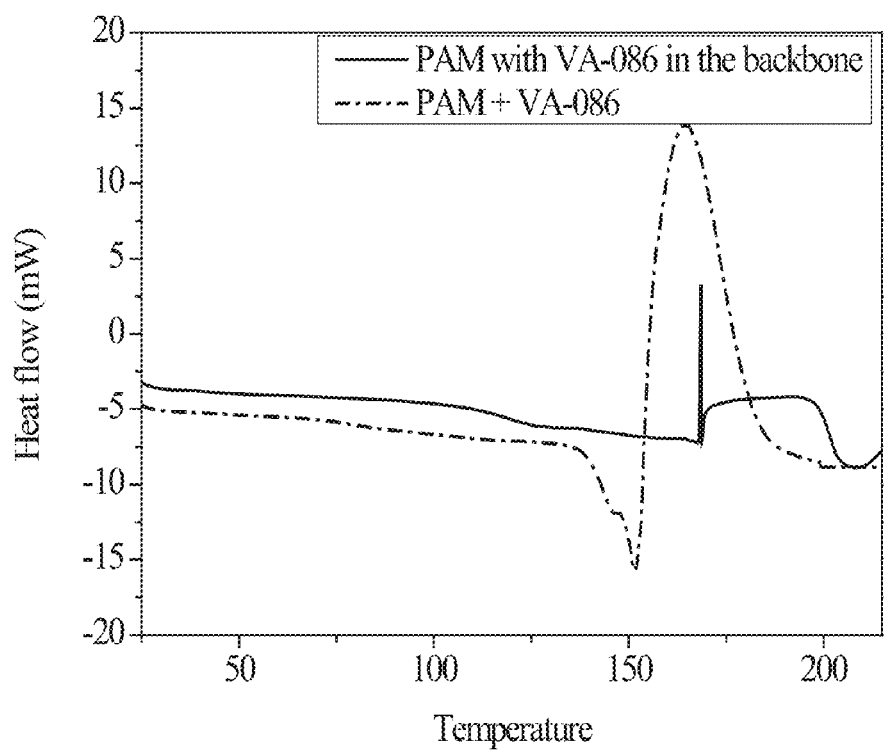
FIG. 5 is a DSC thermogram relating to a DSC analysis of PAM with azo-functionalities in the backbone.

DSC analysis of PAM with azo-functionalities in the backbone. In order to further confirm the presence of azo-functionalities in the poly(acrylamide) backbone, differential scanning calorimetry has been used. The thermal behavior of commercial poly(acrylamide) and commercial poly(acrylamide) mixed with the azo-initiator VA-086 were compared with poly(acrylamide) containing degradable VA-086 links (FIG. 5). An amount of VA-086 equivalent to that covalently incorporated into PAM was mixed with pure PAM and used for the DSC analysis. Referring to FIG. 5, in both cases, an apparent exothermic peak due to decomposition of the azo groups was observed, however, the shape and the maxima of these peaks are different. The maximum degradation tem-

TABLE 1

| Sample No. | AM/Vac [g] [mol × L⁻¹] | VA-086 [g] [mmol × L⁻¹] | Ce⁺⁴ [g] [mol × L⁻¹] | Polymerization time [h] | Yield [%] | $M_w$ [kDa] | VA-086 content [mol %] | No of weak links/chain |
|---|---|---|---|---|---|---|---|---|
| 1 | 2.5/014<br>3.0/0.14 | 0.06<br>17 | 0.23<br>35 | 2.5 | 35 | 2,850 | 0.17 | 17 |
| 2 | 2.5/0.14<br>2.9/0.14 | 0.12<br>35 | 0.46<br>70 | 2.5 | 21 | 390 | 0.58 | 8 |
| 3 | 2.5/0.14<br>2.9/0.14 | 0.12<br>35 | 0.46<br>70 | 3.5 | 25 | 400 | 0.56 | 8 |
| 4 | 2.5/0.14<br>2.9/0.0 | 0.6<br>170 | 0.56<br>85 | 3.0 | 19 | 190 | 1.95 | 13 |
| 5 | 2.5/0.14<br>2.9/0.14 | 0.6<br>170 | 1.12<br>170 | 3.0 | 12 | 140 | 1.56 | 8 |

Figure 4A:
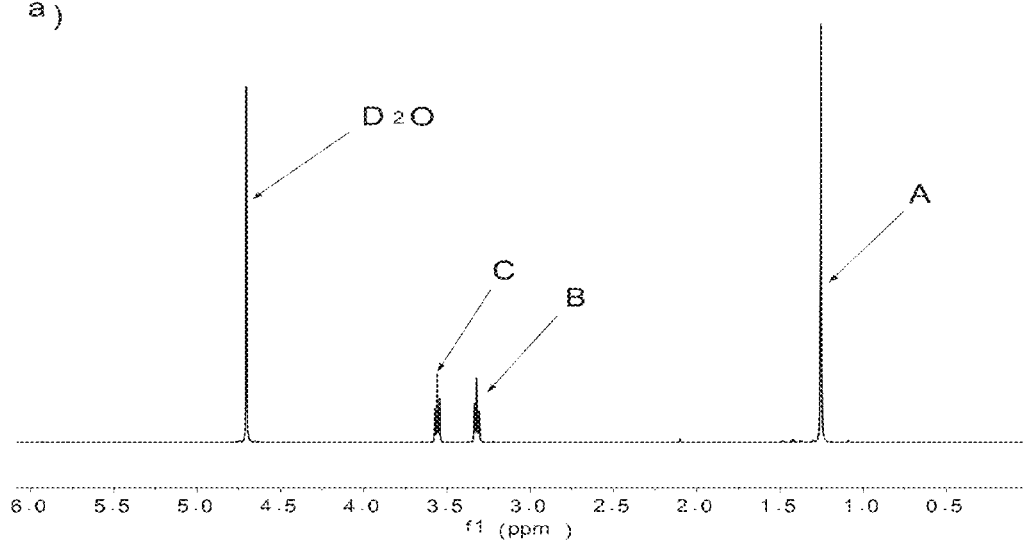
FIGS. 4A, 4B and 4C show $H^1$-NMR spectra of VA-086, commercial poly(acrylamide) and poly(acrylamide) initiated by redox initiation using the Ce(IV)/VA-086 redox pair were recorded in $D_2O$.
Figure 4B:
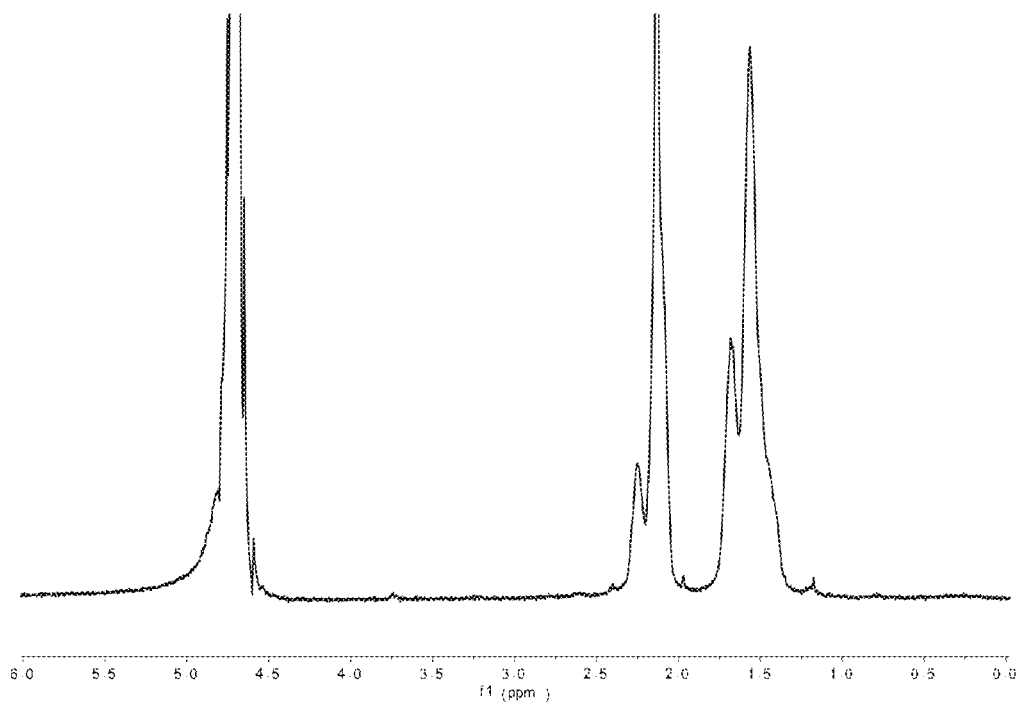
Figure 4C:
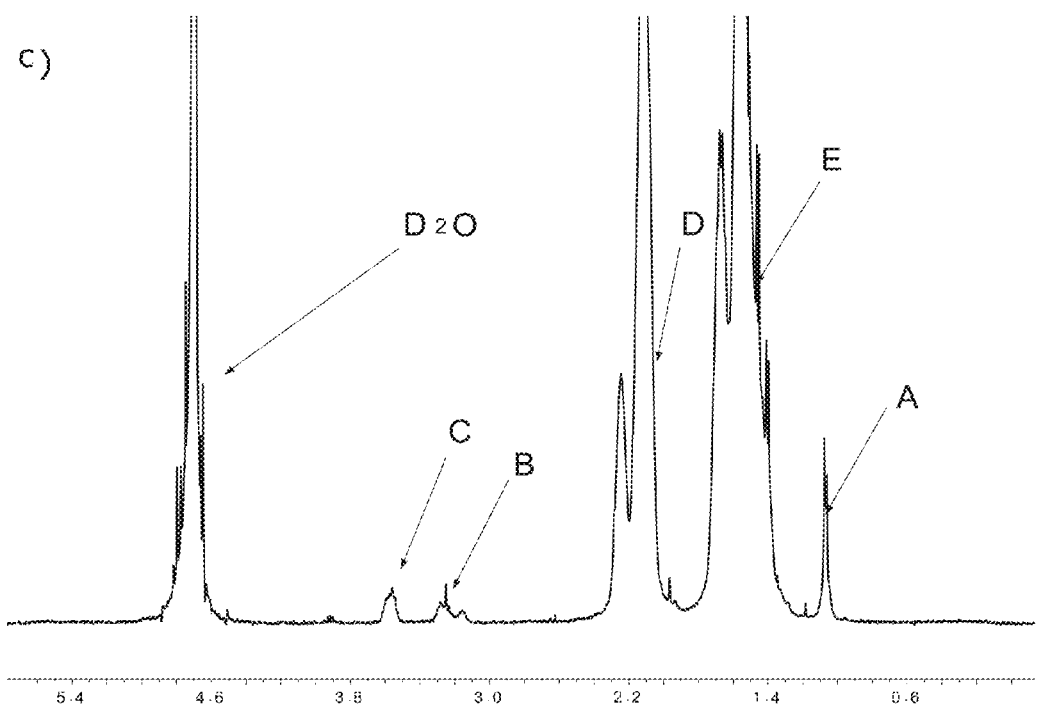

The $H^1$—NMR spectra of VA-086, commercial poly(acrylamide) and poly(acrylamide) initiated by redox initiation using the Ce(IV)/VA-086 redox pair were recorded in $D_2O$ and are shown in FIGS. 4A, 4B, and 4C. Formulae 5 and 6 show the chemical structure of a) 2,2-azobi(2-methyl-(2-hydroxyl)proponamide and b) poly(acrylamide) initiated using a 2,2-azobi(2-methyl-(2-hydroxyl)proponamide/Ce(IV) redox pair. Protons characteristic for poly(acrylamide) and VA-086 were identified and assigned (Formulae 5 and 6). In the spectrum of VA-086 (FIG. 4A) chemical shifts for protons from methylene groups ($CH_2$) marked as C and B can be distinguished in the 3.52-3.57 ppm range and 3.30-3.35 ppm range, respectively. The strong singlet from the protons of the methyl groups A appears at 1.24 ppm. In the spectrum of the commercial poly(acrylamide) (FIG. 4B) peaks in the range of 1.2-1.8 ppm and 2.0-2.4 ppm correspond to the protons of the methylene (E) and methine (D) groups of PAM. All protons for PAM and 2,2-azobi(2-methyl-(2-hydroxyl)proponamide could be identified and assigned in the $H^1$-NMR spectrum of perature for PAM with azo functionalities in the backbone was observed at 192° C., whereas for PAM mixed with VA-086 at 164° C. The shift and the shape of the exothermic peak, in the thermogram of PAM containing azo-functionalities in the backbone, is caused by the different chemical environment due to the covalent incorporation of VA-086 into PAM.

Figure 6:
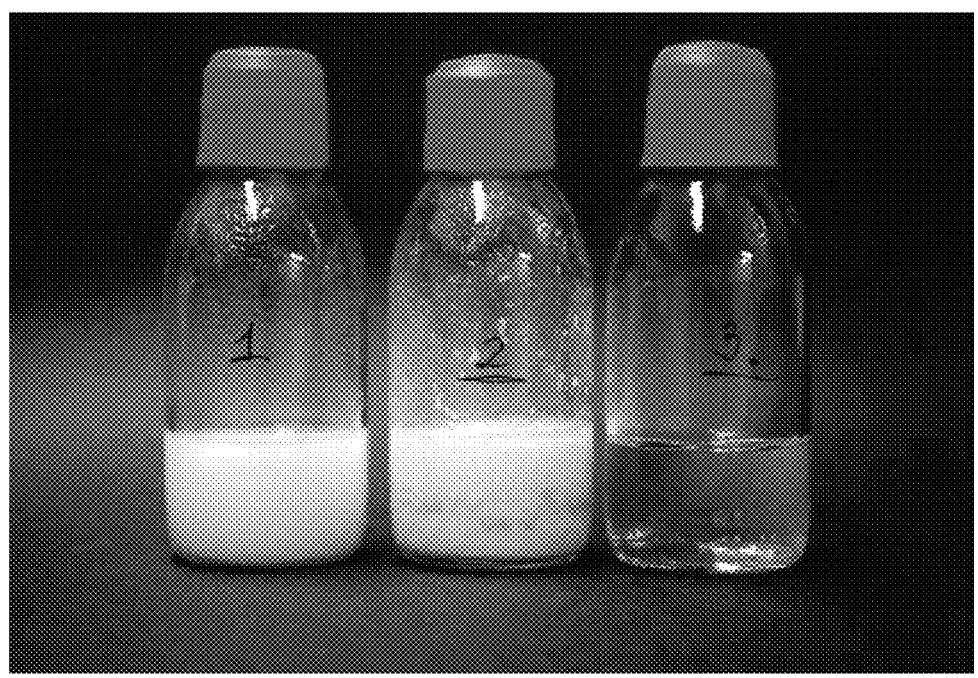
FIG. 6 illustrates various results of polymerizing acrylonitrile using PAM containing azo-functionalities in the backbone as an initiator.

Initiation of polymerization from PAM with incorporated azo-functionalities. Acrylonitrile was polymerized using PAM containing azo-functionalities in the backbone as an initiator. FIG. 6 illustrates the various results observed. In Sample 1, possibly due to the insolubility of poly(acrylonitrile) (PAN) in water, the synthesized acrylonitrile-acrylamide copolymer precipitated from the solution in form of very fine white powder. For comparison, acrylonitrile in the presence VA-086 azoinitiator and acrylonitrile without any initiator was subjected to the same polymerization condition. Poly(acrylonitrile) produced by normal free radical polymerization initiated using VA-086 precipitated as yellow powder, while pure acrylonitrile did not polymerize within the time of the experiment, as shown in Samples 2 and 3 in FIG. 6.

The solubility of poly(acrylamide)-block-poly(acrylonitrile) was tested. Poly(acrylamide)-block-poly(acrylonitrile) was soluble in dimethyl sulfoxide (DMSO), which is also a solvent for pure poly(acrylonitrile), but it did not dissolve in any solvents for pure poly(acrylamide), such as water, formamide or ethylene glycol.

Figure 7A:
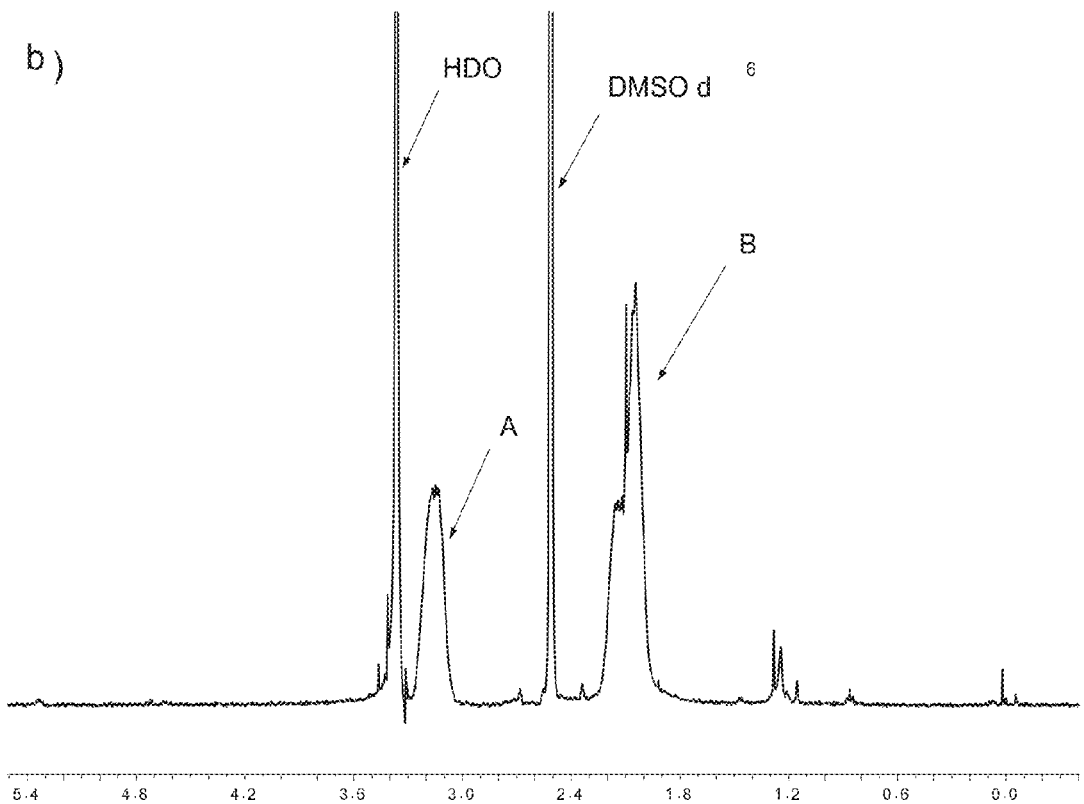

The $H^1$-NMR spectra of poly(acrylonitrile) and poly(acrylamide)-block-poly(acrylonitrile) synthesized using poly(acrylamide) with thermo-sensitive azo groups in the backbone are shown in FIGS. 7A and 7B. The $H^1$-NMR spectrum of the copolymer shows peaks for methylene (D) and methine (B) protons characteristic for PAM at 1.39 ppm and at 2.09 ppm, respectively. The methylene protons of poly(acrylonitrile) (B) overlapped with methine protons of poly(acrylamide) (C) at 2.09 ppm, whereas characteristic methine protons of poly(acrylonitrile) (A) can be clearly seen as a quite broad peak at 3.15 ppm. Formula 7 is a chemical structure of poly(acrylamide)-block-poly(acrylonitrile).

Formula 7

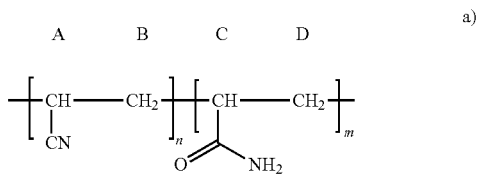

Referring to FIGS. 7A and 7B, the presence of peaks of both PAM and PAN in spectrum FIG. 7B indicates that poly(acrylamide)-block-poly(acrylonitrile) was indeed synthesized; thus it again confirms that poly(acrylamide) used for copolymerization contained covalently incorporated azo groups in the backbone.

Degradation Behavior of PAM Containing Azo Groups in the Backbone.

Figure 8:
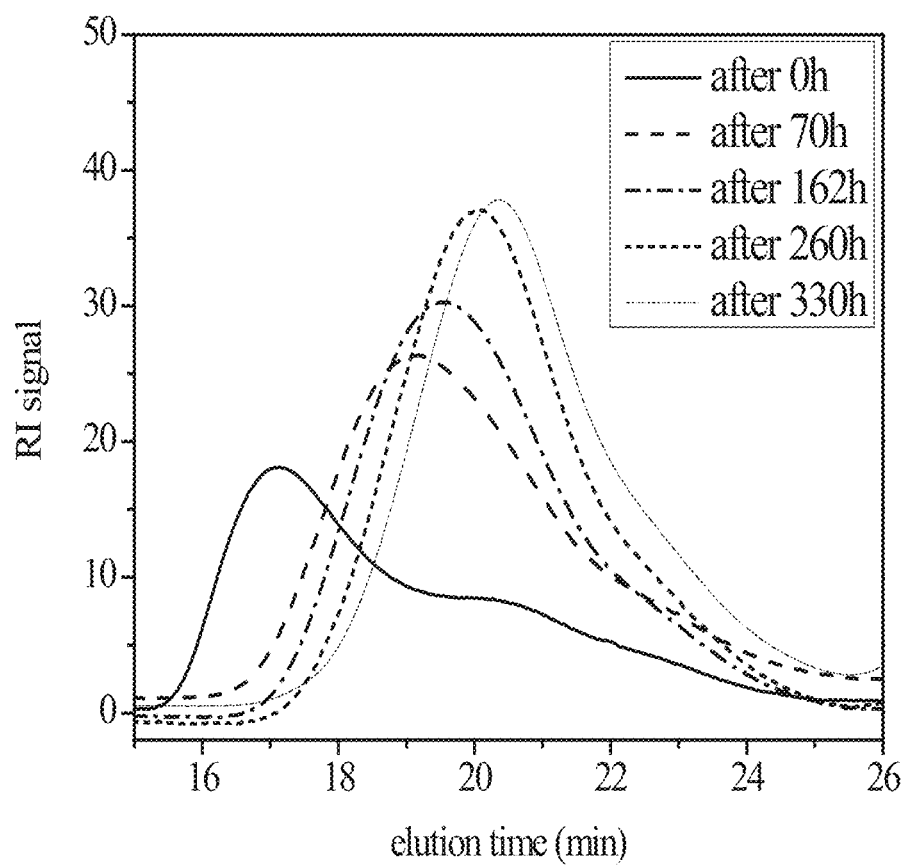
FIG. 8 illustrates a GPC chromatogram of PAM containing azo groups before and after being subjected to 86° C. for various times as described in the Examples section.

Degradation of the PAM with azo-functionalities in the backbone was studied using GPC. FIG. 8 shows the response of the RI detector for PAM containing temperature sensitive azo groups before and after subjecting it to a temperature of 86° C. We believe that the higher response of the detector and an increase of the elution time were due to the cleavage of the temperature sensitive azo groups in the polymer backbone.

Because VA-086 contains hydroxyl groups on both ends, the polymerization of acrylamide was initiated from both sides of the reducing agent, allowing for the incorporation of at least one azo group into the polymer. The number of azo groups in the backbone and hence the molecular weight of the polymer after degradation depends on the termination step of the polymerization. In case of bimolecular recombination one expects at least two azo groups in the polymer backbone, whereas in case of disproportionation or unimolecular termination only one azo group would be incorporated. Peak molecular weight $M_p$ and weight average molecular weight $M_w$ of PAM containing azo-functionalities during the degradation process are tabulated in Table 3. The $M_p$ of the polymer before degradation was around 4,400 kDa. In the first 70 h $M_p$ decreased to 600 kDa, which was about 14% of the original polymer molecular weight. Over the next 270 h the molecular weight of the PAM with azo groups in the backbone decreased further but at a lower rate and stabilized when $M_p$ of the polymer reached 260 kDa (about 6% of the original molecular weight of the polymer). Based on the molecular weight of the polymer before and after degradation, it can be assumed that about 11 weak links were successfully built in the polymer backbone, which would be about 0.11 mol %. The amount of VA-086 calculated from $H^1$-NMR spectrum for sample 3 (Table 1) is higher—0.17 mol %, which based on $M_p$ calculations would stand for up to 26 weak links. These results are based on $M_w$ and previous result based on Mp.

We believe that this discrepancy can be caused either by an error due to very small intensity of the peaks from VA-086 or recombination of some radicals, which would affect the molecular weight of the polymer after degradation.

The degradation behavior of PAM containing azo groups in the backbone was confirmed by repeating the synthesis of the tested polymer (sample 3) and subjecting it to the same degradation conditions. As expected the same degradation trend was observed. Additionally, these results were compared with degradation behavior of PAM initiated from PEO. There was a change in molecular weight from $M_p$ 3200 kDa to 2700 kDa. This could be related to conformational changes of the polymer chains rather than cleavage of the polymer backbone. Table 2 shows the Mp and Mw from GPC of the polymer containing azo functionalities in the backbone and percentage Mp reduction after degradation

TABLE 2

| Time (h) | $M_p$ [kDa] | $M_w$ [kDa] | Percentage $M_p$ reduction after degradation [%] |
|---|---|---|---|
| 0 | 4,430 | 2850 | 0 |
| 70 | 600 | 650 | 86 |
| 162 | 480 | 500 | 89 |
| 260 | 270 | 300 | 93 |
| 330 | 260 | 250 | 94 |

Ability of PAM Containing Azo-Groups in their Backbone to Reduce Turbulent Drag.

The influence of the concentration of PAM containing azo groups in the backbone on the drag reduction of water solutions was studied and compared to the results obtained for PAM initiated from PEO. For both polymers the percentage of drag reduction increased with increasing concentration leveling off at 300 ppm; both polymers follow the same trend (see FIG. 9). Frictional drag due to turbulent Taylor flow was reduced by about 30% even at polymer concentrations as low as 25 ppm. A further increase in the concentration of the PAM containing azo groups enabled to reduce the drag up to 56% turbulent Taylor flow, while PAM with a molecular weight of 5-6 million DA reduces the drag by 55%.

Figure 9:
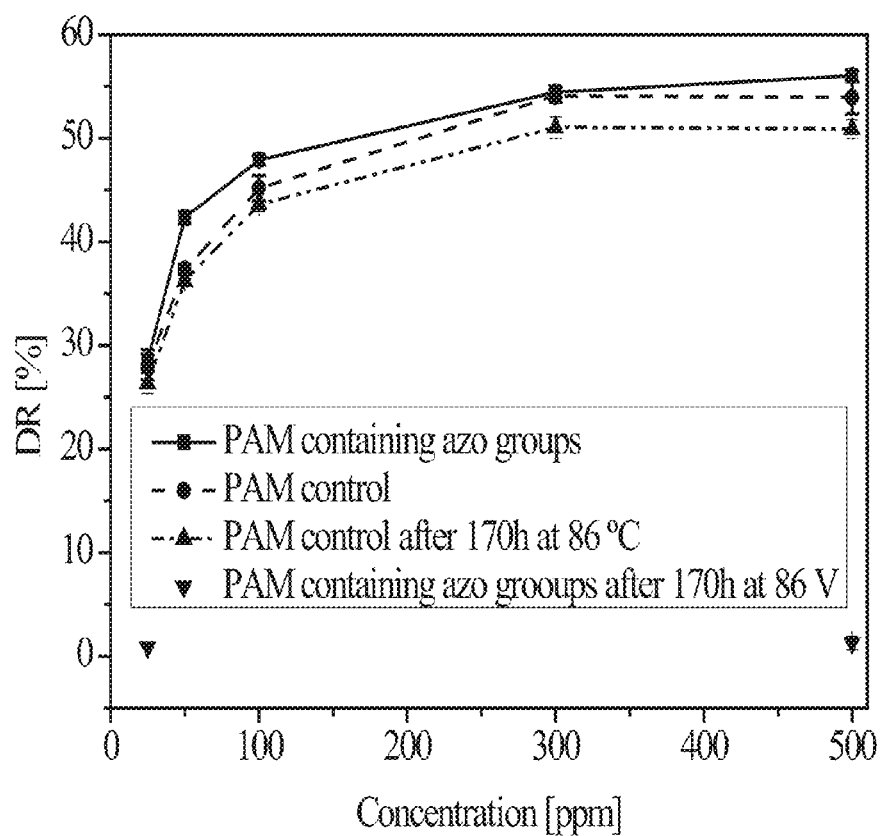
FIG. 9 illustrates the percentage of drag reduction as a function of polymer concentration for both PAM initiated from PEO and PAM with azo groups built in the polymer backbone as described in the Examples section.

The ability of PAM containing azo groups to reduce frictional drag should diminish or disappear after exposure to high temperature. Studied PAM solutions were subjected to a temperature of 86° C. After 170 h at 86° C., the polymer solutions were tested for the second time for its ability to reduce drag using exactly the same procedure as before. As expected for such a massive decrease of the molecular weight of the polymer, the percent of the drag reduction decreased as well from 56% DR to a level of 1% DR, as shown in FIG. 9. The control experiment, using PAM synthesized by initiation from the PEO/Ce(IV) pair, was carried out in order to test the DR behavior of PAM without containing weak, temperature sensitive links in the backbone once subjected to the same conditions (86° C. for 170 h). A negligible decrease in drag reducing abilities of PAM without azo groups in the backbone was observed; the drag reduction ability of turbulent Taylor flow of PAM without azo groups for a 500 ppm concentration dropped from 53%±1.6% to 50%±0.8% after exposure to 86° C.

Thus, we believe we have determined that azo functional groups may be successfully incorporated into a poly(acrylamide) backbone by redox polymerization using a water-soluble azo initiator 2,2'-azobis[2-methyl-(2-hydroxyethyl)propionamide] (VA-086) as a reducing agent and Ce(IV) as an oxidizing ion. $H^1$-NMR spectra of the synthesized polymer confirm the presence of azo functionalities in the polymer backbone. This result was supported by DSC testing where an exothermic peak from the degradation of azo groups can be observed in the PAM initiated from VA-086. The synthesized PAM containing azo groups in the backbone was used as an initiator for the free radical initiator polymerization of acrylonitrile, which resulted in the synthesis of PAM-block-PAN. This also indicates that active azo groups were incorporated into the PAM backbone. PAM with temperature-sensitive azo groups in the backbone can degrade when subjected to a temperature above the degradation temperature of azo groups; in this case 86° C. A significant decrease from 4,430 kDa to 260 kDa of the molecular weight of PAM-containing temperature sensitive azo groups in the backbone and very little change in the molecular weight of "normal" PAM was observed, after subjecting both polymers to 86° C. Drag reduction tests carried out for the PAM, with and without built in azo groups, also indicate that this polymer synthesized by redox polymerization is a useful drag reducing agent. It has been also shown that after exposure to 86° C. the polymer loses its drag reducing ability, whereas PAM without azo groups retains almost the same drag reducing properties. This experiment indicates the effectiveness of redox polymerization in incorporating labile groups into polymer backbone.

Example 3

Experimental

Reagents: Acrylamide (98%, BDH) was purified by re-crystallisation from methanol (99.5%, Fluka). Other reactants used for the polymerization, such as poly(caprolactone) diols with molecular weights $M_w$ 530, 1250 and 2000 (99%, Aldrich), vinyl acetate (≥99%, Fluka), ceric ammonium nitrate (98.5%, Fluka), sodium dodecyl sulphate (≥99%, Aldrich), 70% nitric acid (Aldrich) were used as received. Oxygen free nitrogen was purchased from BOC and deionized water was purified using Option 4 (Elga, UK). Other reagents, such as poly(acrylamide) 5-6 million Da (PAM) (Polysciences, Inc.), sodium nitrate (≥98%, BDH), sodium azide (≥99%, Fluka), phosphorus pentoxide (≥98%, Aldrich) were also used without further purification. $D_2O$ (99.96%) and acetone-$d^6$ (99.9%) was purchased from Merck and used for NMR analysis.

Procedures: Synthesis of Poly(acrylamide-co-caprolactone)

Polymerization of poly(acrylamide-co-caprolactone) (PAM-co-PCL) was carried out in a 10 ml one neck flask with a magnetic stirrer and sealed with a suba-seal. The acrylamide and vinyl acetate was dissolved in 3 ml of double distilled water and placed in the flask together with poly(caprolactone) diol and sodium dodecyl sulphate in an appropriate concentration (Table 1). First, the mixture was heated to 55° C. for 10 min in order to increase the solubility of poly(caprolactone) diol in water or in surfactant micelles. Next the flask with polymerization mixture was wrapped in the aluminum foil and equilibrated in an oil bath at 40° C. for 5 min. The solution of cerium ammonium nitrate was prepared by mixing an appropriate amount of cerium ammonium nitrate salt with 0.25 ml 1N $HNO_3$. The polymerization solution was purged with nitrogen for 1 min. before and after injecting pre-prepared cerium ammonium nitrate solution. The polymerization was carried out for 2 h. Afterwards the synthesized product was re-precipitated in an access of acetone and then filtered. The precipitate was re-dissolved in water and precipitated in an access of acetone for second time in order to remove most of the un-reacted monomers, poly(caprolactone), and sodium dodecyl sulphate. Afterwards collected product was washed 2-3 times with a small amount of acetone and then filtered. Finally the precipitate was dried to the constant weight over $P_2O_5$ in a desiccator under reduced pressure. The yield of the reaction Y was determined by a gravimetric method:

$$Y[\%] = \frac{W_p}{W_m + W_i} \times 100 \qquad \text{Equation 5}$$

where $W_p$ is a weight of the precipitated product and $W_m$ and $W_i$ are the weights of the monomers and the initiator used, respectively.

Characterization of poly(acrylamide-co-caprolactone):

$H^1$-NMR measurements were carried out on a 2 channel DRX-400 spectrometer (Bruker, Germany). Deuterated solvents such as $D_2O$ and acetone-$d^6$ were used to dissolve studied polymer. Tetramethylsilane (TMS) was used as a generally accepted internal standard. Chemical shifts are expressed in parts per million (ppm, δ).

The molecular weight of the synthesized polymers was determined using gel permeation chromatography (GPC) PL-GPC 50 (Polymer Laboratories, UK) with integrated triple detection system, including refractive index (PL-RI), viscometer (PL-BV 400RT) and light scattering (PL-LS) detectors using two TSK-Gel columns (TOSOH, Japan). A 0.1N $NaNO_3$ containing 200 ppm $NaNO_3$ water solution at 25° C. was used as a mobile phase. A flow rate of 0.7 ml/min was used. Samples were filtered with the syringe filters (0.2 μm) before analysis. Poly(ethylene glycol) standards (Polymer Laboratories, UK) were used for calibration. The data were analyzed using PL Cirrus GPC software (version 3.0) (Polymer Laboratories, UK).

Stabilization of Hexane/Water Emulsion with poly(acrylamide-co-caprolactone).

2 mg of the synthesized copolymer was placed in 2 ml of deionized water and left overnight on the shaker tray at 200 osc/min for dissolution. Afterwards 2 ml of hexane was added to the prepared polymer solutions and the mixture was shaken by hand for about 30 seconds with a approximate frequency of 7 Hz. For the comparison, the same mixture was prepared using pure poly(acrylamide). A picture of the hexane/water+copolymer and hexane/water+poly(acrylamide) was taken after 30 seconds resting.

Results and Discussion

Conditions of the poly(acrylamide-co-caprolactone) Synthesis.

Poly(acrylamide-co-caprolactone) was synthesized via redox polymerization, where poly(caprolactone)diol and ceric ions were used as a redox couple to initiate polymerization of acrylamide as shown in the in Reaction 3 below. Poly(caprolactone) diol as a hydrophobic polymer does not dissolve in water. One way to introduce poly(caprolactone) diol into an aqueous environment is to use emulsion polymerization. By using surface active agents at the concentration above critical micelle concentration (CMC), surfactants will self assemble to form micelles. Hydrophobic domains should improve the solubility of poly(caprolactone) diol in aqueous solution. At the same time hydrophilic hydroxyl groups in the poly(caprolactone) diol should stay attached to the interphase allowing initiation of the polymerization.

Reaction 3

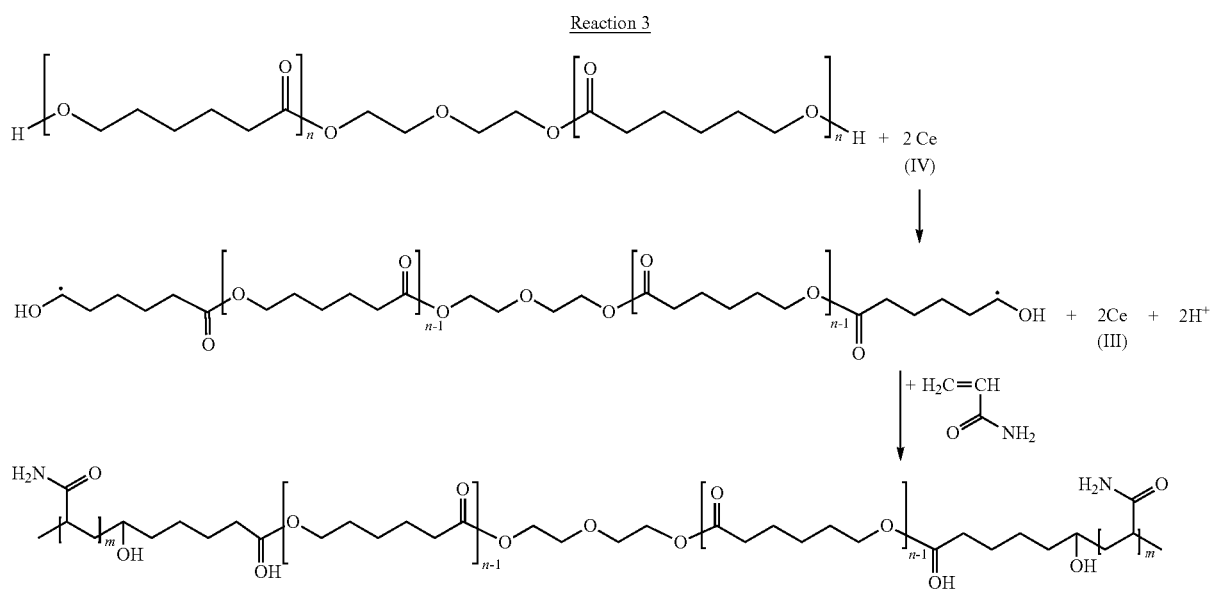

It has been previously reported, that the addition of a small percentage of vinyl acetate (Vac) as a comonomer in polymerization of acrylamide initiated from poly(ethylene glycol)/Ce(IV) redox pair, increased the yield and a molecular weight of synthesized copolymer. In this work, the influence of vinyl acetate and concentration of sodium dodecyl sulphate on the yield of polymerization and a molecular weight was revised. The yield of the polymerization and molecular weight of the obtained polymers are tabulated in Table 1. Yield was calculated only for water soluble copolymers. Water insoluble fraction was also observed as a result of a redox polymerization of acrylamide initiated from poly(caprolactone) diol. Due to the very small amount of water, the insoluble fraction yield was not calculated. Table 3 shows the results and conditions of the polymerization of AM initiated by Ce(IV)/polycaprolactonediol redox system (*) PCL diol 1250 Da has been used as a reducing agent, (**) PCL diol 2000 Da has been used as a reducing agent.

interactions between the SDS layer with protonated acrylamide, there might be an increase in concentration of monomer and ceric ions at the inter-phase, where initiation of the polymerization takes place, resulting in higher yield of the polymerization. Once poly(caprolactone) diols with molecular weight 2000 Da was utilised as an organic reducing agent under the same polymerization condition, decrease in the polymerization yield and molecular weight was observed. It could be related to an increase in the length of poly(caprolactone) chain, hence its hydrophobicity and worse dissolution in surfactant micelles. An additional reason could be a decrease in number of carbons with hydroxyl groups which are available to initiate polymerization.

Influence of vinyl acetate on the yield of the polymerization and a molecular weight has also been studied. It can be observed that vinyl acetate improves the yield of the polymerization and molecular weight of obtained polymers. The observed increase in the yield and molecular weight can be a

TABLE 3

| Sample No. | AM/Vac [g] | PCL diol [g] mol × l$^{-1}$ | Ce$^{+4}$ [g] mol × l$^{-1}$ | SDS [g] mol × l$^{-1}$ | Yield [g] [%] | $M_w$ [Da] |
|---|---|---|---|---|---|---|
| 1 | 0.625/0.035 | 0.1 | 0.125 | 0 | 0.1603 | |
| | 3.0/0.14 | 0.06 | 0.075 | | [20] | |
| 2 | 0.625/0.035 | 0.1 | 0.125 | 0.0086 | 0.1458 | 44,000 |
| | 3.0/0.14 | 0.06 | 0.075 | 0.01 | [21] | |
| 3 | 0.625/0.035 | 0.1 | 0.125 | 0.026 | 0.5988 | 263,000 |
| | 3.0/0.14 | 0.06 | 0.075 | 0.03 | [49] | |
| 4 | 0.625/0 | 0.1 | 0.125 | 0.026 | 0.0746 | 8,000 |
| | 3.0/0.0 | 0.06 | 0.075 | 0.03 | [10] | |
| 5* | 0.625/0.035 | 0.1 | 0.125 | 0.026 | 0.3832 | 305,000 |
| | 3.0/0.14 | 0.026 | 0.075 | 0.03 | [50] | |
| 6** | 0.625/0.035 | 0.1 | 0.125 | 0.026 | 0.1230 | 105,00 |
| | 3.0/0.14 | 0.017 | 0.075 | 0.03 | [16] | |

Comparing sample numbers 1 and 2, when polymerization was carried out with and without an addition of surface active agent, no significant difference in the yield of polymerization was observed. However, once the concentration of SDS increased the polymerization yield improved considerably. Above CMC micellar phase improves solubility of poly(caprolactone) hence more initiation centers are available to start the polymerization. Moreover, as a result of electrostatic result of higher reactivity Vac radicals and therefore in the higher reactivity of formed chain radicals which could lead to faster/easier propagation of polymer chains.

FTIR Analysis of the poly(acrylamide-co-caprolactone).

Figure 10:
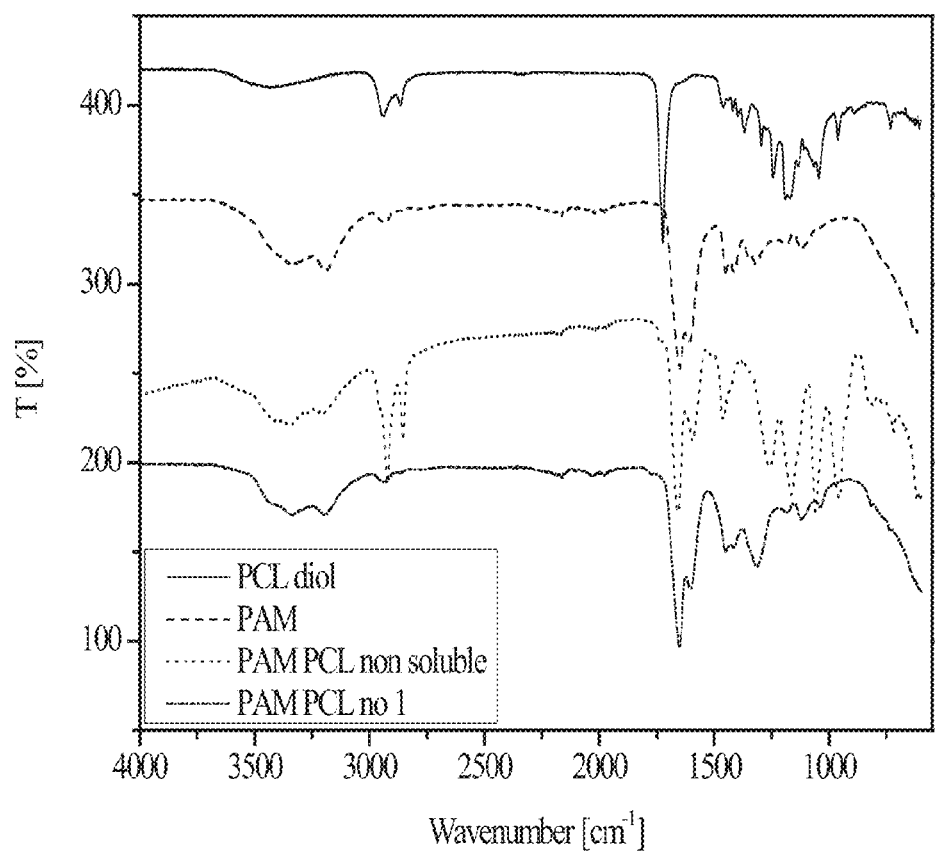
FIG. 10 is an FT-IR spectra of poly(caprolactone) diol, poly(acrylamide) and their copolymers.

The FTIR spectra of poly(acrylamide), poly(caprolactone) diol and synthesized copolymers are presented in FIG. 10. The obtained spectra of the water soluble copolymers do not show characteristic bands for poly(caprolactone). In cases where the copolymer was insoluble in water the spectrum was almost a superposition of the spectra of the pure components PAM and PCL diol. A broad peak due to amid NH— and —OH stretching can be observed at between 3500 cm$^{-1}$ and 3200 cm$^{-1}$. Characteristic absorption bands for C=O group of amide can be observed on copolymers spectra approximately at 1655 cm$^{-1}$. Strong bands in the fingerprint area suggested the presence of poly(caprolactone) diol in the synthesized copolymer.

$^1$H NMR Analysis of the poly(acrylamide-co-caprolactone)

Figure 11A:
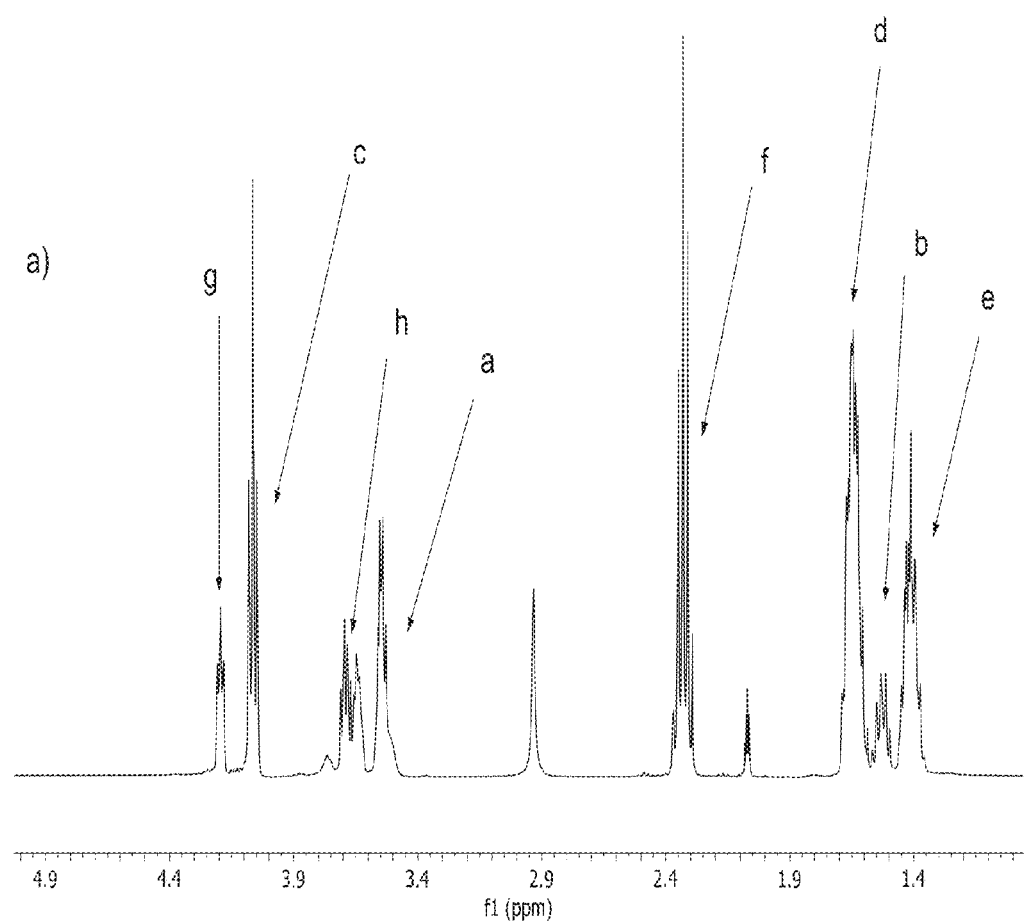
FIG. 11 contains four $H^1$-NMR spectra of (a) poly(caprolactone) diol 530 in $d^6$-acetone, (b) poly(acrylamide) in $D_2O$, (c) poly(acrylamide-co-caprolactone) sample 2 in $D_2O$, and (d) chemical structure of poly(acrylamide-co-caprolactone).
Figure 11B:
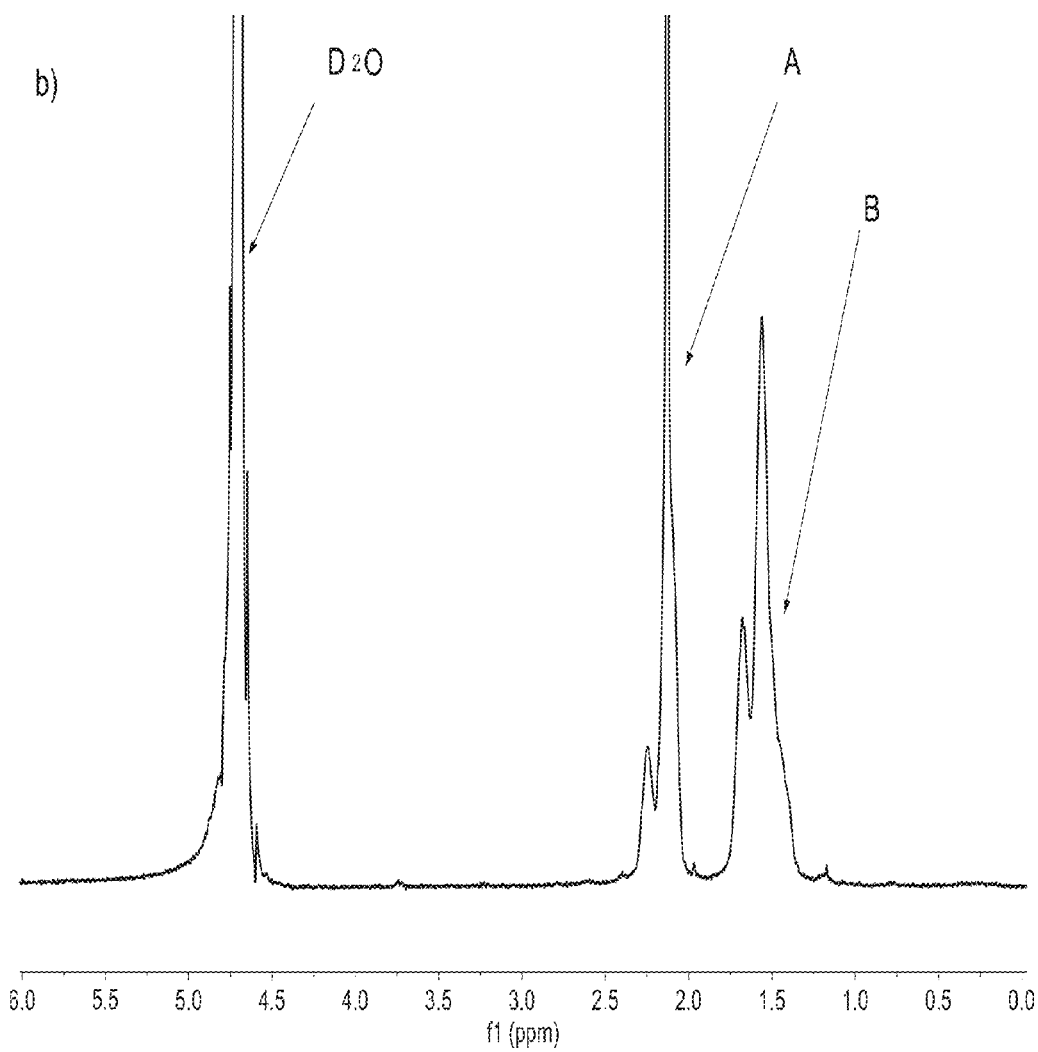
Figure 11:
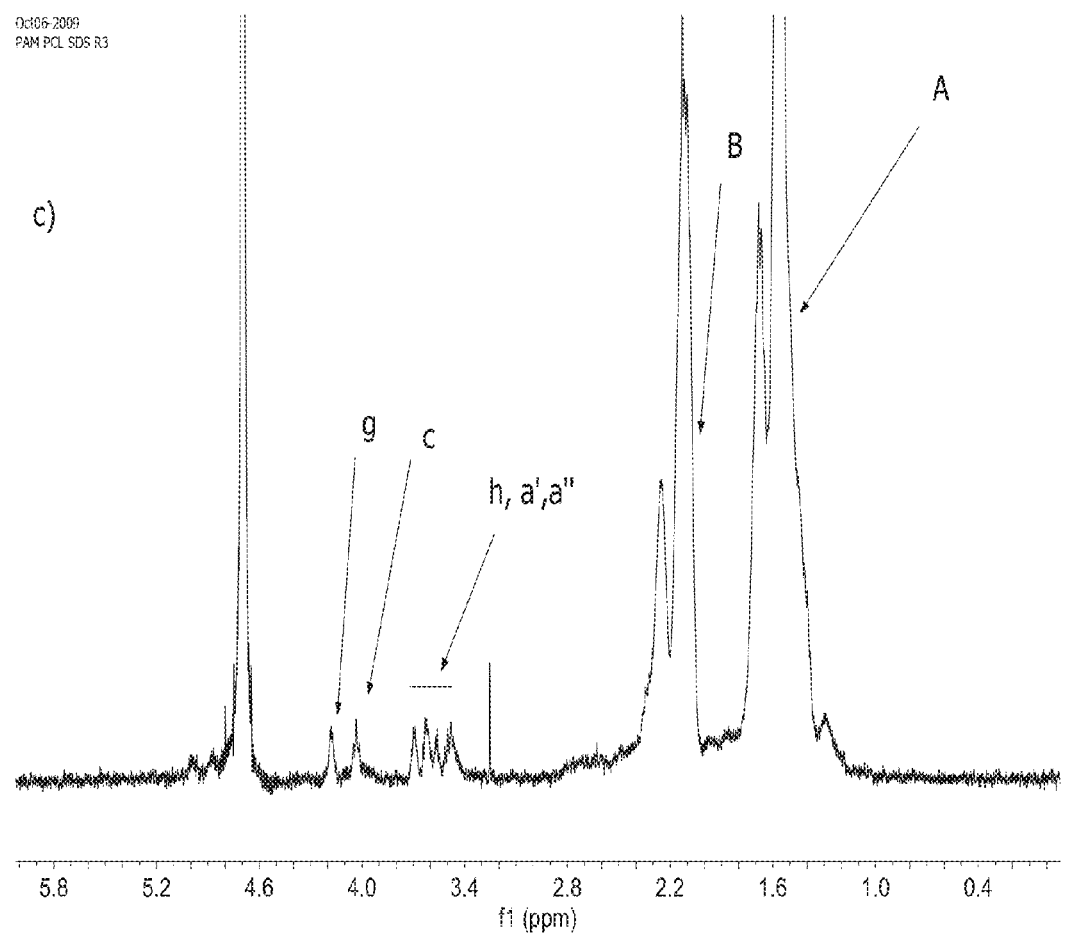
Figure 11D:
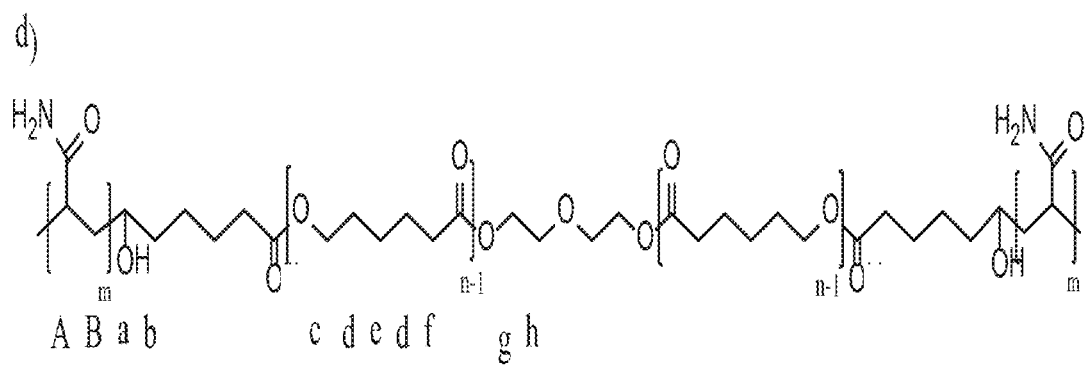
Figure 12A:
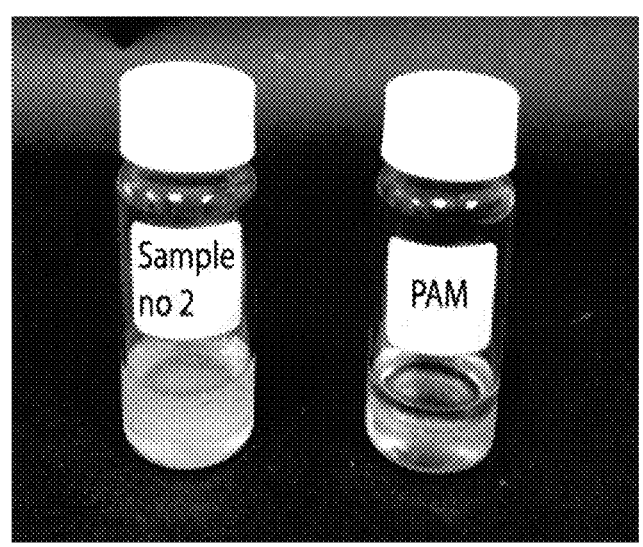
FIGS. 12A-12E illustrate emulsions as described in the Examples section.
Figure 12B:
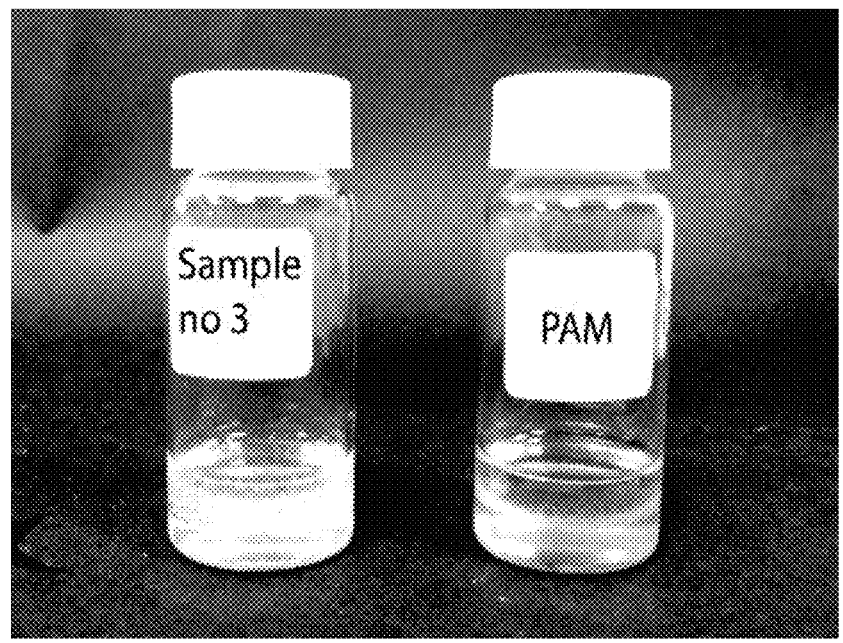
Figure 12C:
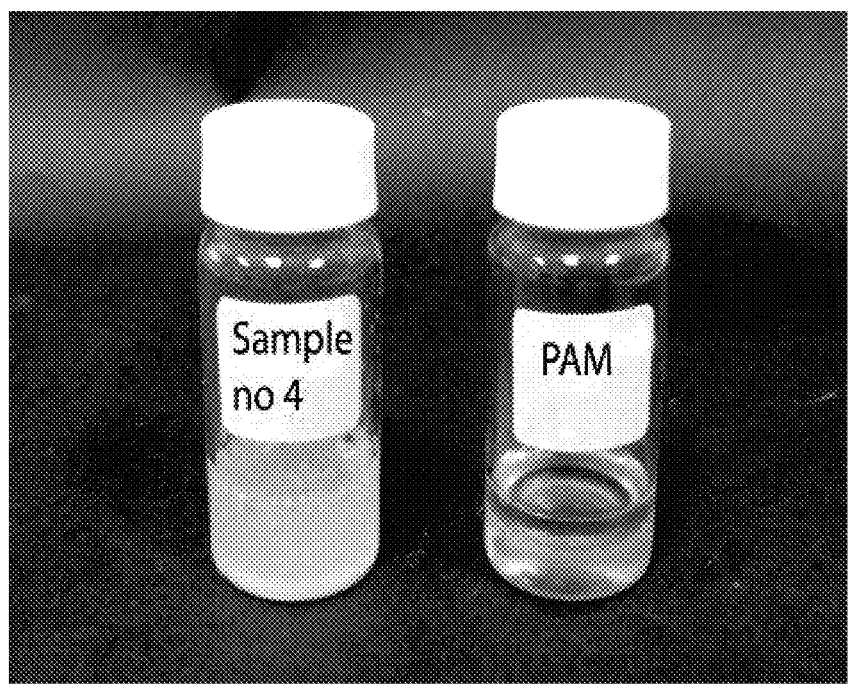
Figure 12D:
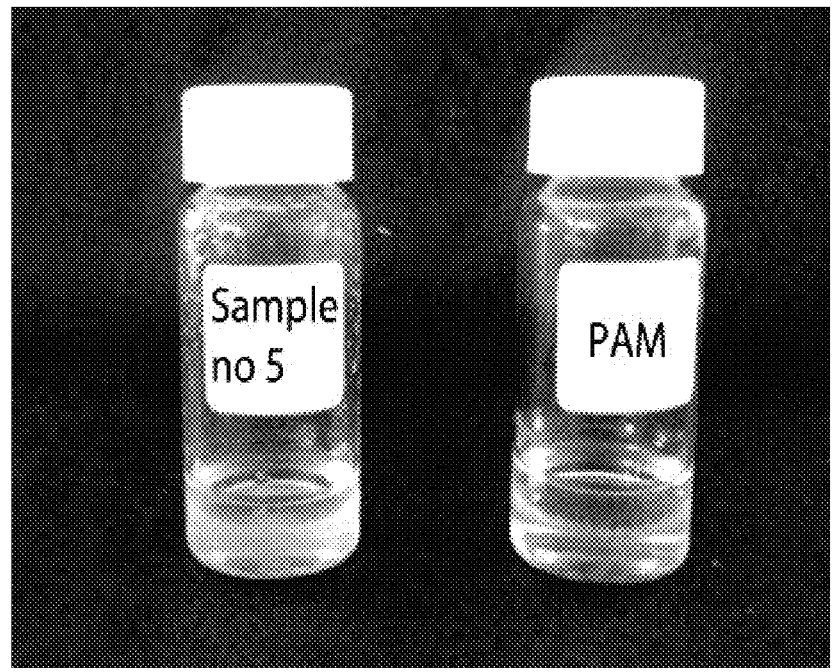
Figure 12E:
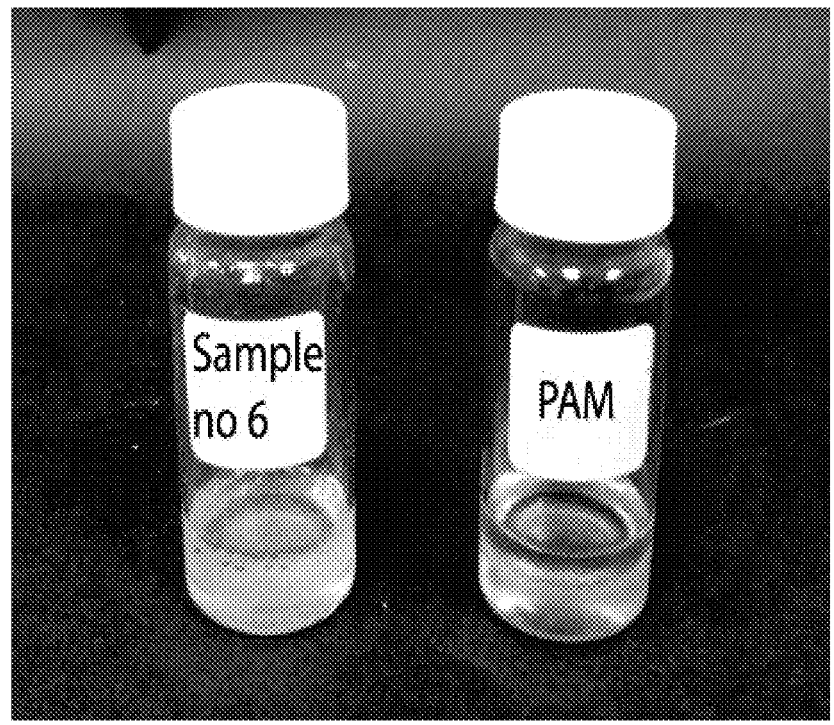

All water soluble copolymers were analyzed by $^1$H-NMR. $^1$H-NMR spectrum of PCL diol was recorded in d$^6$-acetone and spectra of PAM and poly(acrylamide-co-caprolactone)-sample no 2 recorded in D$_2$O are showed in FIGS. 11A, 11B, and 11C.

H$^1$-NMR spectra of sample numbers 3, 5, and 6 did not show any evidence of presence of poly(caprolactone) diol in the backbone. Spectra of the sample number 2 and 4 (sample 4 is not presented) have all the peaks in the copolymer backbone, which can be assigned to corresponding protons of poly(caprolactone) diol and poly(acrylamide). The chemical shifts at 4.22-4.21 ppm, 4.19-4.17 ppm and 3.4-3.75 ppm shown in the spectra of PCL diol and acrylamide initiated from PCL diol are attributed to protons adjacent to ester oxygen (g and c), proton neighboring to the ether oxygen (h) or protons neighboring hydroxyl groups (a). Strong signals in the range of 2.4-2.0 and 1.8-1.2 correspond to the protons in the PAM methine (A) and methylene (B) groups. From Table 3 it can be seen that sample 2 and 4 have much smaller molecular weight than samples 3, 5 and 6, which might suggest that poly(caprolactone) diol was present only on the beginning of the polymer chain and thus sensitivity of the NMR technique was too low to detect it once the ration of PCL/PAM is too low.

Stabililization of Hexane/Water Emulsion with poly(acrylamide-co-caprolactone).

Amphiphilic copolymers can stabilize emulsions (oil/water phase). The stability of the emulsion depends on the concentration of the copolymer and the content of the hydrophobic part in the copolymers. More hydrophobic copolymers stabilize an emulsion more effectively. Stabilization of hexane/water emulsion with poly(acrylamide-co-caprolactone) is a good indicating experiment to check if poly(caprolactone) diol was indeed successfully built in the polymer backbone. For comparison reasons the same concentration of PAM was prepared to observe its ability to stabilize hexane/water emulsion. The results of the experiment can be seen in FIG. 12. FIG. 12 shows emulsions stabilized with PAM-co-PCL compared to pure PAM.

Referring to FIGS. 12A-12E, it was observed that poly (acrylamide) did not stabilize an emulsion contrary to all the studied copolymers, confirming the presence of a hydrophobic portion within a polymer. The emulsions stabilized with the samples 3, 5 and 6 separated due to coalescence very quickly, (within 3 min), whereas the emulsions stabilized by the samples 2 and 4 were noticeably more stable. In case of sample 4, an emulsion did not phase separate even after 24 h. Observed stability of studied emulsions would be in agreement with recorded molecular weight of synthesized copolymers, based on the assumptions that PCL is present only on the ends of poly(acrylamide) chain. Lower molecular weight of the poly(acrylamide-co-caprolactone) meant higher PCL/PAM ratio and thus a more stable hexane/water emulsion.

In this study, we believe that the results indicate that micellar polymerization of acrylamide initiated from poly(acrylamide) diol/Ce(IV) redox pair may yield poly(acrylamide-co-caprolactone) copolymers. The addition of small amount of vinyl acetate as a comonomer increases both the molecular weight of the polymer and the yield of the polymerization. The same trend was observed when concentration of SDS was increased. The presence of polycaprolactone diol in the PAM backbone was confirmed by FT-IR and H$^1$-NMR results. Oil in water emulsion were stabilized using synthesized poly (acrylamide-co-caprolactone) proving their amphiphilic character.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   providing a treatment fluid comprising a crosslinked water-soluble degradable synthetic vinyl polymer having a labile link in its backbone, the labile link being derived from at least one selected from the group consisting of a poly(orthoester), an orthoester, a polyphosphazene, a polycyanoacrylate, any derivative thereof, and any combination thereof; and
   placing the treatment fluid in a subterranean formation.

2. The method of claim 1 wherein placing the treatment fluid in the subterranean formation is a step in a stimulation treatment, a fracturing treatment, an acidizing treatment, a friction reducing operation, or a completion operation.

3. The method of claim 1 wherein placing the treatment fluid is in a gelled fluid pill.

4. The method of claim 1 wherein the crosslinked water-soluble degradable synthetic vinyl polymer having a labile link in its backbone is present in the treatment fluid in an amount of about 0.1% to about 10% by weight.

5. The method of claim 1 wherein placing the treatment fluid in the subterranean formation includes placing the fracturing fluid in a subterranean formation at a pressure sufficient to create or enhance a fracture therein.

6. The method of claim 1 wherein the treatment fluid comprises an emulsion.

7. A method comprising:
   placing a treatment fluid in a subterranean formation, the treatment fluid comprising a crosslinked water-soluble degradable synthetic vinyl polymer having a labile link in its backbone, an aqueous base fluid, and an acid, wherein the labile link comprises at least one selected from the group consisting of disulfide, orthoester, silyl, phosphazine, any derivative thereof, and any combination thereof.

8. The method of claim 7 wherein the crosslinked water-soluble degradable synthetic vinyl polymer having a labile link in its backbone is present in the treatment fluid in an amount of about 0.1% to about 10% by weight.

9. The method of claim 7 wherein the treatment fluid comprises an emulsion.

10. A method comprising:
   placing a treatment fluid in a subterranean formation, the treatment fluid comprising an aqueous base fluid as a continuous phase and micelles that comprise an enclosed chemical and an outer surface of a crosslinked water-soluble degradable synthetic vinyl polymer having a labile link in its backbone, wherein the labile link comprises at least one selected from the group consisting of disulfide, orthoester, silyl, phosphazine, any derivative thereof, and any combination thereof.

11. The method of claim 10 wherein the crosslinked water-soluble degradable synthetic vinyl polymer having a labile link in its backbone is present in the treatment fluid in an amount of about 0.1% to about 10% by weight.

12. The method of claim 10 wherein the enclosed chemical comprises at least one selected from the group consisting of an oxidizer, a chelator, an activator, and an acid-precursor.

\* \* \* \* \*